(12) United States Patent  
Suzuki et al.

(10) Patent No.: US 7,608,366 B2
(45) Date of Patent: Oct. 27, 2009

(54) NONAQUEOUS ELECTROLYTIC SECONDARY BATTERY AND METHOD OF PRODUCING ANODE MATERIAL THEREOF

(75) Inventors: Takashi Suzuki, Aichi (JP); Masanori Nakanishi, Shizuoka (JP); Yoshiro Harada, Shizuoka (JP); Hiroto Sagisaka, Shizuoka (JP)

(73) Assignee: FDK Corporation, Tokyo (JP)

( * ) Notice: Subject to any disclaimer, the term of this patent is extended or adjusted under 35 U.S.C. 154(b) by 110 days.

(21) Appl. No.: 11/516,228

(22) Filed: Sep. 6, 2006

(65) Prior Publication Data

US 2007/0015057 A1 Jan. 18, 2007

Related U.S. Application Data

(63) Continuation of application No. 10/713,554, filed on Nov. 14, 2003, now Pat. No. 7,238,449, which is a continuation of application No. PCT/JP02/04705, filed on May 15, 2002.

(30) Foreign Application Priority Data

May 15, 2001 (JP) ............................. 2001-145587

(51) Int. Cl.
 *H01M 4/58* (2006.01)
(52) U.S. Cl. ................................. 429/231.95
(58) Field of Classification Search .............. 429/231.8, 429/231.95, 94; 241/24.12
See application file for complete search history.

(56) References Cited

U.S. PATENT DOCUMENTS 5,474,861 A * 12/1995 Bito et al. .................. 429/221
5,989,743 A 11/1999 Yamashita

FOREIGN PATENT DOCUMENTS

| EP | 780920 | 6/1997 |
|---|---|---|
| JP | 61-010882 | 1/1986 |
| JP | 63-194319 | 8/1988 |
| JP | 02-262277 | 10/1990 |
| JP | 03-245458 | 11/1991 |
| JP | 04-366554 | 12/1992 |
| JP | 05-325970 | 12/1993 |
| JP | 05325970 | 12/1993 |
| JP | 06-176794 | 6/1994 |
| JP | 08-031422 | 2/1996 |
| JP | 08-153542 | 6/1996 |
| JP | 08-162095 | 6/1996 |
| JP | 09-320599 | 12/1997 |
| JP | 10-241735 | 9/1998 |
| JP | 11-007943 | 1/1999 |
| JP | 2000-313609 | 11/2000 |
| JP | 2001-106519 | 4/2001 |
| WO | WO-96/10273 | 4/1996 |

* cited by examiner

*Primary Examiner*—Patrick Ryan
*Assistant Examiner*—Monique Wills
(74) *Attorney, Agent, or Firm*—Harness, Dickey & Pierce, PLC

(57) ABSTRACT

A nonaqueous electrolyte secondary battery having a positive electrode made of a carbonaceous material, an electrolyte containing a lithium salt, and a negative electrode made of metallic lithium or a material capable of occluding and releasing lithium, wherein said positive electrode is formed from a boronized graphitic material containing boron or a boron compound such that the content of boron therein is 0.05-11 wt %. A method for production of the positive electrode of the nonaqueous electrolyte secondary battery.

3 Claims, 19 Drawing Sheets

NONAQUEOUS ELECTROLYTIC SECONDARY BATTERY AND METHOD OF PRODUCING ANODE MATERIAL THEREOF

CROSS-REFERENCE TO RELATED APPLICATIONS

This application is a continuation of U.S. patent application Ser. No. 10/713,554 filed on Nov. 14, 2003, which is a continuation of PCT/JP02/04705 filed May 15, 2002. This application also claims the benefit of Japanese Patent Application No. 2001-145587 filed May 15, 2001. The disclosure(s) of the above application(s) are incorporated herein by reference.

BACKGROUND OF THE INVENTION

1. Field of the Invention

The present invention relates to a nonaqueous electrolyte secondary battery and a process for production of the positive electrode material thereof, said nonaqueous electrolyte secondary battery having a positive electrode made of a carbonaceous material, a negative electrode made of metallic lithium or a material capable of occluding and releasing lithium, and an electrolyte containing a lithium salt as the solute.

2. Background Art

There have been a variety of nonaqueous electrolyte secondary batteries which find use in various fields owing to their high energy density acquired after charging. Unfortunately, they suffer the disadvantage of becoming nearly or completely unusable after a certain number of repeated charging-discharging cycles. In order to improve the cycle life of the secondary battery of this kind, the present inventors carried out a series of researches, with their attention paid to a nonaqueous electrolyte secondary battery which has a positive electrode formed from a graphitized carbonaceous material, an electrolyte containing a lithium salt, and a negative electrode formed from metallic lithium or a material capable of occluding and releasing lithium.

There has long been known a nonaqueous electrolyte secondary battery which has a positive electrode formed from a graphitized carbonaceous material, an electrolyte containing a lithium salt, and a negative electrode formed from metallic lithium. Also, attempts have been made to improve its cycle characteristic by forming its negative electrode from a carbonaceous material capable of occluding and releasing lithium (as disclosed in Japanese Patent Application Laid-open Publication Nos. Sho61-7567 and Hei2-82466, for example). These attempts were made in view of the fact that metallic lithium undergoes dissolution and deposition repeatedly after charging-discharging cycles, thereby forming dendrites and causing passivation, which reduces the cycle life.

The nonaqueous electrolyte secondary battery constructed as mentioned above is usually assembled in its discharged state, so that it remains incapable of discharging until it is charged. The charging-discharging reaction will be explained below with reference to a battery which has a negative electrode formed from a graphitic material capable of reversibly occluding and releasing lithium.

When the battery is charged for the first cycle, the following reactions take place. Anions in the electrolyte are occluded into the positive electrode (or graphitic material), and cations (or lithium ions) in the electrolyte are occluded (by intercalation) into the negative electrode. In the positive electrode are formed a graphite intercalation compound of acceptor type, and in the negative electrode is formed a graphite intercalation compound of donor type. During discharging that follows charging, the cations and anions which have been occluded respectively into the two electrodes are released (by deintercalation), and the battery decreases in voltage. This charging-discharging reaction may be represented by the following equations.

Positive electrode:

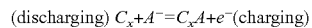

Negative electrode;

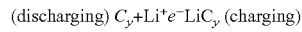

In the secondary battery of this kind, the positive electrode utilizes the reaction which reversibly forms a graphite intercalation compound containing anions as the result of charging and discharging.

A variety of positive electrode materials have so far been considered as listed below: Graphitized carbon fiber (Japanese Patent Laid-open Publication No. Sho61-10882), exfoliated graphite sheet (Japanese Patent Application Laid-open Publication No. Sho63-194319), woven cloth of graphitized carbon fiber (Japanese Patent Application Laid-open Publication No. Hei4-366554), plastic-reinforced graphite, natural graphite powder, pyrolized graphite, graphitized carbon fiber grown from gas phase, and PAN-derived carbon fiber.

Unfortunately, the battery of this kind suffers the disadvantage of decreasing in discharge capacity after repeated charging-discharging cycles. This results mainly from the deterioration of the positive electrode material, which takes place as follows. As the charging-discharging cycles are repeated, anions of comparatively large molecules are repeatedly occluded into and released from the graphitic material. The repeated occlusion and release break graphite crystals and crack graphite particles, making part of graphite incapable of charging and discharging any longer. Decrease in discharging capacity accelerates particularly in the case the charging-discharging cycles are repeated, with the charging capacity held above a certain level (about 24 mAh/g). In this case, too, the electrode can hardly keep its shape.

On the other hand, it has been confirmed that the battery having a positive electrode of graphitized carbon fiber grown from gas phase exhibits an extended life longer than 400 cycles if it is charged and discharged, with the charging capacity limited to 36 C/g (=10 mAh/g) per unit weight of graphitic material. However, the problem with low capacity still remains unsolved.

Incidentally, the term "graphitizing" used in this specification means the solid-phase transition of amorphous carbon into graphite by thermal energy. To be more specific, it implies heat treatment at 2000° C. or above irrespective of the degree of crystallinity after graphitization. The term "carbonaceous material" denotes any substance (including organic polymeric compounds) composed mainly of carbon atoms. It is not specified by the regularity of atom arrangement. Likewise, the term "graphitic material" denotes a solid substance composed mainly of carbon atoms forming the crystalline structure with three-dimensionally regular arrangement. It may or may not be the graphitized material mentioned above. Also, the graphitic material is included in the carbonaceous material.

The present invention was completed to tackle the above-mentioned problems. It is the principal object of the present invention to provide a nonaqueous electrolyte secondary battery having a large capacity and an outstanding cycle characteristic and to provide a method for production of the positive electrode material of the secondary battery.

SUMMARY OF THE INVENTION

The present invention to tackle the above-mentioned and other problems is embodied in a nonaqueous electrolyte secondary battery comprising a positive electrode made of a carbonaceous material, an electrolyte containing a lithium salt, and a negative electrode made of metallic lithium or a material capable of occluding and releasing lithium, wherein said positive electrode is formed from a boronized graphitic material containing boron or a boron compound such that the content of boron therein is 0.05-11 wt %.

The present invention is embodied also in a method for production of a positive electrode material for a nonaqueous electrolyte secondary battery having a positive electrode made of a carbonaceous material, an electrolyte containing a lithium salt, and a negative electrode made of metallic lithium or a material capable of occluding and releasing lithium, comprising grinding at least one species, as said carbonaceous material for the positive electrode, selected from a graphitic material, an easily graphilizable carbonaceous material or a starting material thereof, and a carbon precursor, mixing the ground product with fine powder of boron or a boron compound and a binding component, forming the mixture into shapes, heating them in an inert gas atmosphere (for graphitization or carbonization), and finally grinding the heat-treated shapes and classifying the ground particles.

BRIEF DESCRIPTION OF THE DRAWINGS

FIG. 1A represents the case in which the positive electrode is equal to the negative electrode in area. FIG. 1B represents the case in which the positive electrode is larger than the negative electrode in area. FIG. 1C represents the case in which the positive electrode is smaller than the negative electrode in area;

DETAILED DESCRIPTION OF THE INVENTION

[Outline of Disclosure]

Figure 1A:
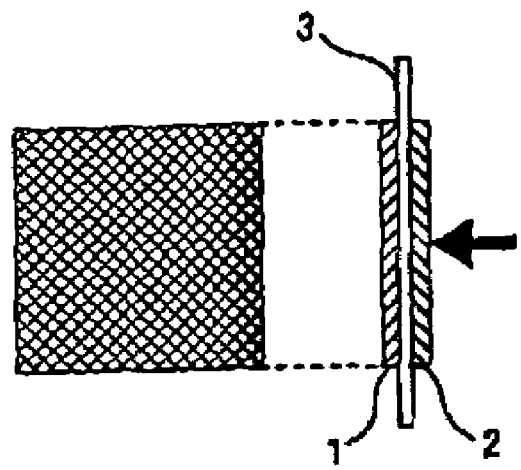
FIGS. 1A-1C are schematic diagrams showing the arrangement of a square positive electrode and a square negative electrode which face each other. The right side drawings are longitudinal sectional views of the positive and negative electrodes arranged with a separator interposed between them. The left side drawings are side views (with the separator omitted) as seen in the direction of the arrow.

The fist aspect of the present invention involves a nonaqueous electrolyte secondary battery comprising a positive electrode made of a carbonaceous material, an electrolyte containing a lithium salt, and a negative electrode made of metallic lithium or a material capable of occluding and releasing lithium, wherein said positive electrode is formed from a boronized graphitic material containing boron or a boron compound such that the content of boron therein is 0.05-11 wt %.

The term "boronized graphitic material" used herein denotes a graphitic material (mixture) composed of a solid solution in which carbon atoms constituting graphite are partly substituted by boron atoms and a boron compound typified by boron carbide.

Ordinary synthetic graphitic materials are prepared from organic materials (such as petroleum pitch, coal tar pitch, condensed polycyclic hydrocarbon compounds, and organic polymeric compounds) by carbonization at 300-700° C. in an atmosphere of inert gas (such as nitrogen, argon, and helium) and subsequent heat treatment (for graphitization) at 2500° C. or above, preferably at 3000° C. or above. Naturally occurring graphite usually has the crystalline structure comparable or superior to that of the above-mentioned synthetic graphite. The highly graphitized synthetic graphitic material and the natural graphite have very few lattice defects in crystals on account of the large crystallite and the small lattice strain between adjacent hexagonal network planes.

Unfortunately, the graphitic materials mentioned above decrease in the capacity of reversible occlusion and release as the charging-discharging cycles proceed because the graphite crystals disintegrate upon electrochemical occlusion of anions. The reason for this is that the hexagonal network planes are stacked by weak Van der Waals force only and hence cleavage takes place easily upon interaction with anions whose molecular size is larger than the distance between two hexagonal network planes. On the other hand, it is generally known that the graphitic material has a large capacity to occlude and release anions (in the initial cycle only) and hence has a stable discharging curve in proportion to the degree of crystallinity.

The present inventors found that the graphitic material greatly improves in cycle characteristics while keeping a large capacity of occlusion and release if it has its degree of crystallinity increased and it has its crystal structure stabilized by introduction of partial defects. This finding led to the first aspect of the present invention. According to the present invention, the graphitic material which has a high degree of crystallinity and also has partial defects introduced therein can be obtained by heat treatment (graphitization or carbonization) of a carbonaceous material containing boron or a boron compound. In the present invention, the graphitic material obtained in this manner is specially referred to as "boronized graphitic material".

A typical method for production of boronized graphitic material involves mixing an easily graphitizable carbonaceous material (or a starting material thereof) or a carbon precursor with boron or a boron compound (in powder form) and subsequently heating the resulting mixture for carbonization or graphitization. After heat treatment, the boron or the boron compound remains in the graphitized carbonaceous material in such a state that boron atoms partly replace carbon atoms constituting graphite crystals or boron atoms infiltrate into the gap between graphite layers. In the case of solid solution substitution, the boron atoms which have substituted carbon atoms constituting the hexagonal network plane remain, so that the hexagonal network plane becomes strained at the part of substitution. On the other hand, interstitial boron atoms remain in the gap between hexagonal network planes, so that adjacent two network planes become strained. It is considered that the strain introduced in this manner prevents crystals from disintegration at the time of intercalation of anions into crystals, thereby contributing to the stabilized structure.

The starting material of the easily graphitizable carbonaceous material is typified by pitches such as coal tar pitch and petroleum pitch. These pitches are obtained from coal tar or crude oil by refining (such as distillation, extraction, pyrolysis, and carbonization) or reforming.

Other starting materials that can be used are condensed polycyclic aromatic compounds (COPNA resin) derived from aromatic compounds (such as naphthalene, phenanthrene, anthracene, pyrene, perylene, and acenaphthylene) and organic polymeric compounds (such as polyvinyl chloride resin). These starting materials pass through the liquid phase at about 350° C. in the course of heat treatment, thereby forming a carbon precursor which is a polycondensed polycyclic hydrocarbon compound of three-dimensionally laminated structure having anisotropic regions. The resulting carbon precursor is ready to give the graphitic material upon heat treatment to be carried out later. The organic material as the starting material is carbonized at 300-700° C. in an atmosphere of inert gas (such as nitrogen, argon, and helium) and then baked at 800-2000° C. (maximum), thereby giving easily graphitizable carbonaceous material.

The easily graphitizable carbonaceous material also includes carbon fiber derived from mesophase pitch, carbon fiber grown from gas phase, pyrolyzed carbon, mesocarbon microbeads, pitch coke, petroleum coke, and needle coke.

The boronized graphite is obtained from at least one of the easily graphitizable carbonaceous material or a starting material thereof or the carbon precursor by incorporation with boron or a boron compound and ensuing heat treatment (for carbonization and graphitization) in an atmosphere of inert gas.

When to add boron or a boron compound does not matter. It may be added to the starting material, the carbon precursor, or the carbonaceous material obtained. In any case, it is desirable that the boron or the boron compound should previously be ground into fine powder having an average particle diameter no larger than 200 μm, preferably no larger than 50 μm, for complete dispersion at the time of mixing. Boron or a boron compound may be used in the form of simple substance of metallic boron or any boron-containing compound. Examples of the boron compound include cobalt boride, hafnium boride, zirconium boride (and other boride ceramics), boron carbide ($B_4C$), boron oxide ($B_2O_3$), and ortho- or metaboric acid and salts thereof.

The thus obtained carbonaceous material incorporated with boron or a boron compound is carbonized or graphitized by heating at a temperature no lower than 1400° C., preferably no lower than 2000° C., in an atmosphere of inert gas (mentioned above). Thus there is obtained the boronized graphitic material.

The process just mentioned above may be replaced by a process which involves incorporating a graphitic material with boron or a boron compound and subsequently subjecting the graphitic material to heat treatment at a temperature no lower than 2400° C., preferably no lower than 3000° C., in an atmosphere of inert gas. Examples of the graphitic material include carbon fiber derived from mesophase pitch and carbon fiber grown from gas phase (said carbon fiber being graphitized by heat treatment at a temperature no lower than 2400° C.), pyrolyzed carbon, mesocarbon microbeads, polycrystalline graphitic materials (such as pitch coke and petroleum pitch), synthetic graphitic materials, exfoliated graphitic materials, and natural graphitic materials. The exfoliated graphitic material denotes a species of graphite which is obtained by inserting sulfuric acid molecules or acetic acid molecules between graphite layers and suddenly heating the resulting intercalation compound, thereby expanding the gap between layers. It is suitable for use as a raw material of the boronized graphitic material specified in the present invention.

Natural graphite occurs in China, Madagascar, Brazil, Sri Lanka, etc. In its ore state, it contains a large amount of impurities; therefore, simple mixing with boron or a boron compound and ensuing heat treatment at 2400° C. or above hardly permit boron atoms to diffuse into graphite. The result is difficulty in obtaining a graphitic material uniformly containing boron. For this reason, it is necessary to previously remove impurities. This object is achieved by treating a raw graphitic material with an acidic aqueous solution (of hydrofluoric acid, hydrochloric acid, sulfuric acid, or nitric acid, or a mixture thereof), an alkaline aqueous solution (of sodium hydroxide), or an organic solvent, thereby dissolving impurities. It is also possible to remove impurities by heat treatment at 500° C. or above in a stream of halogen gas (such as fluorine gas and chlorine gas), thereby purifying the graphitic material.

There is another way (in addition to those mentioned above) of incorporating boron or a boron compound into at least one kind of materials selected from graphitic material, easily graphitizable carbonaceous material (or a starting material thereof), and carbon precursor. It is the ion implantation which employs boron or a boron compound as the ion source. The condition of ion implantation is not specifically restricted. The following condition is preferable:
Beam energy for implantation; 10-500 keV
Beam current: 100-1000 kA
Dose: $10^6$-$10^{20}$ ions/cm$^2$ An excessively high beam current should be avoided because it might heat and deteriorate the sample. After ion implantation, the resulting carbonaceous material is carbonized or graphitized by heat treatment at a temperature no lower than 1400° C., preferably no lower than 2000° C., in an atmosphere of inert gas, as mentioned above. In this way there is obtained the boronized graphitic material as desired.

CVD (chemical vapor deposition) is another useful process of producing a carbon precursor containing boron atoms. CVD in this case employs a boron halide (such as $BCl_3$) as a boron source gas and a hydrocarbon compound (such as benzene, acetylene, ethylene, methane, ethane, and propane) as a carbon source gas. These raw material gases should preferably be used in combination with a carrier gas such as argon. The reaction temperature should preferably be 500-1400° C. With a reaction temperature below the lower limit, the reaction does not proceed completely. With a reaction temperature above the upper limit (say, 1500° C. or above), the reaction forms unevenly distributed $B_3C$ (boron carbide), making it difficult to produce a precursor in which boron atoms are uniformly dispersed. Incidentally, the ratio of boron contained in the resulting carbon precursor may be adjusted by controlling the ratio between the amount of the boron source gas and the amount of the carbon source gas (mol/h) introduced into the reactor. The thus obtained carbon precursor is carbonized or graphitized by heat treatment at a temperature no lower than 1400° C., preferably no lower than 2000° C., in an atmosphere of inert gas, as mentioned above. In this way there is obtained the boronized graphitic material.

According to the first aspect of the present invention, the boronized graphitic material obtained as mentioned above should contain boron or a boron compound such that the content of boron therein is 0.05-11 wt %.

The expression "boron or a boron compound" is used herein to suggest the possibility that boron as simple substance exists in graphite although boron might react with carbon to form a certain compound when boron atoms substitute carbon atoms constituting graphite crystals or boron atoms infiltrate into the gap between graphite layers.

The amount of boron or a boron compound to be added to the carbonaceous material or graphitic material should be properly established such that the amount of boron or a boron compound (in terms of boron) remaining in the boronized graphitic material after heat treatment is in the range of 0.05-11 wt %. It varies depending on the kind of the starting material, the carbon precursor, the stage of carbonization or graphitization, and the kind (characteristic) of the carbonaceous material or graphitic material. If the amount of boron remaining after heat treatment is less than 0.05 wt %, boron will not produce as many defects as necessary to prevent the capacity from decreasing after each charging-discharging cycle. In this situation, the present invention does not produce its full effect. If the amount of boron remaining after heat treatment is more than 11 wt %, boron will form a large amount of boron carbide ($B_4C$) which is unevenly distributed in the graphitic material. The resulting graphitic material has physical inhomogeneities not taking part in charging and discharging. The amount of a boron compound to form solid solution in graphite is limited, and any boron compound exceeding this limit eventually remains in the form of boron carbide ($B_4C$). It is practically impossible to completely separate boron carbide from graphitic material containing boron solid solution. It is necessary to be careful about the amount of boron to be added. However, it is possible to remove part of the residual boron carbide ($B_4C$) if the boronized graphite is kept at a temperature higher than 2250° C. (melting point of boron carbide) under reduced pressure (in the reactor furnace) after the maximum temperature of heat treatment (for carbonization or graphitization) has been reached. In any case, the present invention will produce its full effect so long as the amount of boron contained in the boronized graphite after heat treatment is in the range of 0.05-11 wt %.

The second aspect of the present invention resides in a nonaqueous electrolyte secondary battery as defined above in the first aspect, wherein the positive electrode is formed from a silicon-containing boronized graphitic material containing silicon or a silicon compound such that the content of silicon therein is 0.01-5 wt %.

Simple heat treatment of a carbonaceous material with silicon or a silicon compound does not permit silicon atoms to diffuse deep into it; however, in the presence of boron or a boron compound, silicon atoms infiltrate into crystals or interstices (or crystal boundaries) between crystals constituting the carbonaceous material, owing to the catalytic action of boron. After infiltration, silicon atoms remain in the form of silicon carbide, thereby contributing to the mechanical stability of crystal structure. As the result, the repeated occlusion and release of anions that take place as the charging-discharging reaction proceeds does not break the crystal structure of the positive electrode. This leads to an improvement in the charging-discharging characteristic of the positive electrode.

When to add silicon or a silicon compound does not matter as in the case of boron or a boron compound mentioned above. It may be added to the starting material mentioned above or it may be added to a carbon precursor or a carbonaceous material derived therefrom, or a graphitic material. It should preferably be added at the same time as boron or a boron compound is added. The reason for this is that boron catalytically promotes the diffusion of silicon into the carbonaceous material. In any case, good dispersibility is achieved if silicon or a silicon compound is previously ground into fine powder having an average particle diameter no larger than 100 μm, preferably no larger than 30 μm. Examples of silicon or a silicon compound include inorganic silicon compounds (such as silicon monoxide (SiO), silicon dioxide ($SiO_2$) tetrachlorosilane ($SiCl_4$), silane ($SiH_4$silicon carbide, and silicon nitride) and organosilicon compounds (such as silicone resin and silicon-containing polymeric compounds). Addition of silicon or a silicon compound may be accomplished by means of ion implantation or CVD as in the case of boron. CVD employs as a silicon source gas tetrachlorosilane ($SiCl_4$), trichlorosilane ($SiHCl_3$), or trichloromethylsilane ($CH_3SiCl_3$).

The amount of boron (or a boron compound) and silicon (or a silicon compound) to be added to the carbonaceous material should be properly established such that the amount of boron or a boron compound (in terms of boron) remaining in the boronized graphitic material after heat treatment is in the range of 0.05-11 wt % and the amount of silicon or a silicon compound (in terms of silicon) remaining in the boronized graphitic material after heat treatment is in the range of 0.01-5 wt %. They vary depending on the kind of the starting material, the carbon precursor, the stage of carbonization or graphitization, and the kind (characteristic) of the carbonaceous material or graphitic material. If the amount of silicon remaining after heat treatment is less than 0.01 wt %, silicon will not produce its effect and the resulting graphitic material will have no advantage over the graphitic material containing boron alone. If the amount of silicon remaining after heat treatment is more than 5 wt %, silicon will prevent the crystal growth of boronized graphite by heat treatment, thereby decreasing the charging-discharging capacity. Moreover, excess silicon gives rise to a large amount of silicon carbide (SiC) in the graphitic material which do not play part in the charging-discharging reactions.

The third aspect of the present invention resides in a method for production of a positive electrode material for a nonaqueous electrolyte secondary battery having a positive electrode made of a carbonaceous material, an electrolyte containing a lithium salt, and a negative electrode made of metallic lithium or a material capable of occluding and releasing lithium, said process comprising grinding at least one species, as said carbonaceous material for the positive electrode, selected from a graphitic material, an easily graphitizable carbonaceous material or a starting material thereof, and a carbon precursor, mixing the ground product with fine powder of boron or a boron compound and a binding component, forming the mixture into shapes, heating them in an inert gas atmosphere (for graphitization or carbonization), and finally grinding the heat-treated shapes and classifying the ground particles.

The ordinary method for producing the boronized graphitic material has been mentioned above. The heat treatment for carbonization or graphitization causes boron atoms to diffuse into the gap between hexagonal network planes of graphite. This diffusion is a solid-phase reaction or a gas-phase reaction, and hence how frequently the substitution reaction takes place between boron atoms and carbon atoms constituting the hexagonal network planes depends on the area of contact between boron or a boron compound and the raw carbonaceous material (at least one species selected from a graphitic material, an easily graphitizable carbonaceous material or a starting material thereof, and a carbon precursor) and also on the distance over which boron atoms can diffuse. Consequently, it is desirable to pulverize the carbonaceous material together with boron or a boron compound and then perform said heat treatment on the shapes formed under pressure from the pulverized mixture. Unfortunately, the pulverized powder is difficult to form and the resulting shape (even if possible to form) is so fragile as to handle (or transport), and the expected result might not be achieved. In view of the foregoing, the present inventors adopted a process in which a binding component is added to and mixed with said raw carbonaceous material and boron or a boron compound and the mixture is formed into shapes for subsequent heat treatment. It was found that this process solves the above-mentioned problems and gives the positive electrode material which exhibits improved charging-discharging cycle characteristics when used for the nonaqueous electrolyte secondary battery of the present invention. This finding led to the present invention. A probable reason for the improvement is that the process causes more boron atoms to substitute carbon atoms in the hexagonal network planes constituting graphite, thereby stabilizing the crystal structure of the boronized graphitic material in which the reversible occlusion and release of anions take place.

The above-mentioned binding component should preferably be selected in consideration of its characteristics of adhesion and wetting with the raw carbonaceous material and boron or a boron compound. Examples of the binding component include phenol-formaldehyde resin, polyfurfuryl alcohol, polyacrylonitrile, carboxymethylcellulose, polyvinylidene fluoride, polyimideamide, polyvinyl alcohol, polyamide resin, and a variety of condensable polycyclic aromatic resins. Mixing should preferably be carried out in a liquid phase (in slurry form or resilient rubbery form) of solvent in which the binding component is dispersed together with the raw carbonaceous material and boron or a boron compound. The solvent used for this purpose may be any one which is capable of dispersing the binding component therein. Examples of the solvent include dimethyl acetamide, dimethylformamide, dimethylsulfoxide, N-methyl-pyrrodin-2-one, and water. When mixing is complete, residual solvent may be removed by evaporation. Pitches (such as petroleum pitch and coal tar pitch) having an adequate softening point inherently exhibit the binding action, and hence they permit mixing in a liquid phase without any additional solvent if it is heated at a temperature above the softening point.

The mixture thus obtained is formed into shapes usually by pressing. However, pressing is not essential. Forming into shapes may be accomplished by pouring the mixture in slurry form into a mold, followed by evaporation, drying, and demolding. The resulting shapes as such undergo heat treatment (for carbonization or graphitization) as mentioned above.

Forming under pressing may be accomplished by drying the mixture, pulverizing the dried mixture, granulating the resulting powder, and forcing the granules into a mold of desired shape under pressure. However, since the above-mentioned raw carbonaceous material is composed of crystal grains which are anisotropic more or less, the conventional extrusion molding or compression molding gives anisotropic granules in which graphite particles or coke particles orient in a certain direction. This might decrease the rate of reaction with boron or a boron compound. Therefore, it is desirable to employ cold isostatic pressing (CIP molding) for granulation. Granules obtained in this manner are free of orientation because of uniform pressure in all directions. Another advantage of CIP molding is the ability to give a powder compact having a higher density (or a lower porosity) than that obtained by any other method under the same pressure, because CIP molding produces no friction between the mold and the powder being molded, unlike the conventional molding method. The thus obtained powder compact permits smooth reactions (for substitution to form solid solution) to take place between boron atoms and carbon atoms constituting the hexagonal network planes of graphite crystals. CIP molding is simply carried out in the following manner. (1) The powder to be molded is placed in a rubber mold. (2) The rubber mold is tightly sealed, with optional degassing. (3) The sealed rubber mold is pressed in a pressing medium held in a pressing vessel. (4) Pressure is kept for a prescribe period of time, and demolding follows, with pressure released.

The molded product obtained by the above-mentioned procedure undergoes heat treatment (for carbonization or graphitization) and grinding and particle size classification. Grinding may be carried out by using a variety of crushers such as pin mill, ball mill, jet mill, and colloid mill. The resulting particles are classified according to the object.

The forth aspect of the present invention resides in a process for production of a positive electrode material of a nonaqueous electrolyte secondary battery as defined in the third aspect of the present invention, wherein said process further comprising incorporating the carbonaceous material for the positive electrode after its grinding with fine powder of silicon or a silicon compound, in addition to the fine powder of boron or a boron compound, and further incorporating the resulting mixture with a binding component, forming the mixture into shapes, heat-treating (for carbonization or graphitization) the shapes in an atmosphere of inert gas, grinding the heat-treated shapes, and finally classifying the resulting powder.

In the present invention, the fourth aspect is to the second aspect what the third aspect is to the first aspect. The fourth aspect of the present invention is intended to disperse silicon atoms more uniformly into the silicon-containing boronized graphitic material which is defined in the second aspect of the present invention.

This process involves simply adding silicon or a silicon compound to the raw material used for the process defined in the third aspect of the present invention. It remains the same in the kind of the binding component, the method of adding and mixing the binding component, the method of molding, and the effect of the invention produced by these factors.

The fifth aspect of the present invention is a modification to the third or fourth aspect of the present invention directed to a method for production of a positive electrode material, said modification being characterized in that the positive electrode material obtained by grinding and particle size classification has an average particle diameter of 10-60 μm and also has a particle-size distribution such that particles having a particle diameter no larger than 5 μm account for no more than 10% (by volume) of the entire positive electrode material.

The term "average particle diameter" mentioned above is the value calculated from the following equation.

$$\{(\Sigma nd^2)/(\Sigma n)\}^{1/2}$$

where, n denotes the number of particles and d denotes the diameter of individual particles which are measured by using a particle size distribution measuring apparatus of laser diffraction scattering type.

The fifth aspect of the present invention requires that the boronized graphitic material be composed of particles such that those particles having a particle diameter no larger than 5 μm account for no more than 10% (by volume) and the average particle diameter is in the range of 10-60 μm. Meeting this requirement leads to improved load characteristics as indicated by a high ratio of the discharge capacity for a high current density to the discharge capacity for a low current density.

The positive electrode material of the present invention functions as follows in the nonaqueous electrolyte secondary battery. That is, at the time of charging, it occludes anions dissolved in the electrolyte, and at the time of discharging, it releases said anions into the electrolyte. Therefore, when the battery is in a charged state, the positive electrode keeps anions occluded in the crystal structure of the boronized graphite, and when the battery is in a discharged state, the positive electrode permits anions to diffuse into the crystal structure (solid phase) of the boronized graphite, with the result that anions dissolve in the electrolyte. If the boronized graphite is composed of large particles, the distance for diffusion in the solid phase is so large that the load characteristic is poor. In the fifth aspect of the present invention, the upper limit of the particle size is specified by the average particle diameter no larger than 60 μm.

On the other hand, in the case of a nonaqueous electrolyte secondary battery having a positive electrode made of boronized graphitic material, the charging-discharging efficiency in the first cycle is often by far lower than that in the second and subsequent charging-discharging cycles. Numerically speaking, the charging-discharging efficiency is about 60-80% in the first cycle and it increases to about 100% in the second and subsequent cycles. It is apparent that the problem with low charging-discharging efficiency is peculiar to the first cycle. The reason for this is that (1) the quantity of electricity necessary for charging is partly consumed for decomposition of the electrolyte and (2) anions intercalated in the boronized graphitic material partly become unable to release themselves. The irreversible change in capacity resulting from (1) leaves decomposition products accumulating on the surface of the particles of the boronized graphite. Such decomposition products produce a resistance to the electrochemical reaction. This resistance should be as small as possible because it greatly affects the load characteristics. The present inventors found that the charging-discharging efficiency in the first cycle varies depending on the particle size distribution and also found that the charging-discharging efficiency in the first cycle becomes lower and the load characteristic becomes poorer as the content (by volume) of fine particles increases. Therefore, the fifth aspect of the present invention specifies that the boronized graphitic material should be composed of particles such that those particles having a particle diameter no larger than 5 μm account for no more than 10% (by volume) of the entire boronized graphitic material and the average particle diameter is no smaller than 10 μm.

The object of decreasing as far as possible the content (by volume) of fine particles having a particle diameter no larger than 5 μm may be achieved by removing as much fine powder as possible by classification after the grinding of the boronized graphitic material. This object may also be achieved by heat-treating the ground powder with phosphoric acid. This heat treatment oxidizes and removes extremely fine particles (of the order of submicrons) electrostatically sticking to the particle surface. The temperature of this treatment should be 700° C. or above which is higher than the boiling point of phosphoric acid.

The sixth aspect of the present invention specifies spectroscopically the strain of crystal structure and the degree of crystallinity which change upon introduction of defects into the graphitic material.

The sixth aspect of the present invention resides in the nonaqueous electrolyte secondary battery in which the positive electrode (or the boronized graphitic material) specified in the first to fifth aspects of the present invention meets the following requirements (a) and (b).

(a) the carbonaceous material having the graphite crystal structure has the (002) plane such that the average interplaner spacing d(002) is no larger than 3.365 Å.
(b) Raman spectroscopy with an argon ion laser beam having a wavelength of 5145 Å gives a peak (Pa) in the wavelength region of 1580±100 cm$^{-1}$ and a peak (Pb) in the wavelength region of 1360±100 cm$^{-1}$, with the peak (Pa) having a peak intensity (Ia) and the peak (Pb) having a peak intensity (Ib) such that the value of R defined by the following equation 1 is no smaller than 0.35.

$$\text{Value } (R)=Ib/Ia \quad \text{(Equation 1)}$$

Vibrational spectra due to Raman scattering usually provide information about molecular structure and atomic arrangement. For example, natural graphite, which is considered to be a nearly complete single crystal, gives a single Raman band in the wavelength region of 1580±100 cm$^{-1}$. By contrast, polycrystalline artificial graphite and amorphous active carbon and glasslike carbon give an additional Raman band in the neighborhood of 1360±100 cm$^{-1}$. Usually, the ratio of the intensity of the band near 1360 cm$^1$ to the intensity of the band near 1580 cm$^{-1}$ increases with the increasing amount of amorphous carbon in the sample. Consequently, the value R (or the ratio of intensity) defined in the sixth aspect of the present invention is often used as a parameter to indicate the degree of graphitization.

These two Raman bands have their respective peak intensities calculated from the spectrum shape fitted to Lorenz function by the least square method, with the baseline properly established. When the amount of boron carbide ($B_4C$) or silicon carbide (SiC) remaining in the boronized graphitic material (which has been defined in the first to fourth aspects of the present invention), the background might increase on account of fluorescence induced by these components. In this case, the baseline should be corrected by subtracting said background such that only said peak due to graphite remains.

The value (R) mentioned above is closely related with the size (La) of crystallite in the a-axis direction which is obtained from X-ray diffractometry. There is a linear relationship between the value (R) and the reciprocal of La (1/La) for various kinds of carbonaceous materials. It is reported that an empirical formula of La (Å)≈44/R is inductively obtained.

On the other hand, the carbonaceous material mentioned in the present invention may be examined for interplaner spacing d(002) of the (002) plane by powder X-ray diffractometry. Usually, the d(002) decreases with the increasing temperature of heat treatment. It eventually approaches 3.354 Å which is the d(002) interplaner spacing of an ideal graphite crystal; however, it never decreases below this limit. For example, a graphitic material has a crystal structure in which hexagonal network planes consisting of carbon atoms are placed on top of the other with three-dimensional regularity. However, it is also possible to consider that a portion consisting of orderly piled layers and a portion consisting of disorderly piled layers are mixed together. A relational expression, d(002)=3.440−0.086×(1−$p^2$) is reported, where p stands for the ratio of the disorderly piled portion to the entire graphite. The value d(002) is also used often as a parameter to indicate the degree of graphitization.

As mentioned above, the present invention specifies the graphitic material in terms of R and d(002) as a parameter to indicate the degree of graphitization. For example, there may be used a synthetic graphitic material graphitized such that d(002) is no larger than 3.365 Å, or there may be used a natural graphitic material in which crystals have highly developed such that d(002) is no larger than 3.365 Å. These graphitic materials have very few lattice defects in the crystals because the size of crystallite is large and the lattice strain is small between adjacent hexagonal network planes. These graphitic materials usually have a value of a no larger than 0.25 which is estimated from the Raman band.

By contrast, the graphitic material specified in the sixth aspect of the present invention has a value of d(002) no larger than 3.365 Å and a value of R no smaller than 0.35. This suggests that it entirely differs from ordinary synthetic graphitic material or natural graphitic material. The reason for this is that the crystals of the graphitic material have a high degree of crystallization and also have defects partly introduced thereinto. The number of defects introduced can be estimated in terms of the value of R which is calculated from the Raman spectra.

The Raman band at 1360 cm$^{-1}$, which is observed for a variety of carbonaceous materials, is closely related with defects in the crystal lattice. This band results from the vibration mode which does not exist in the graphite crystal of hexagonal lattice; Raman activity is induced by structural defects existing in the crystal. This is because the structural defects reduce or eliminate the symmetry of hexagonal lattice. Therefore, it can be said that the value of R represents the number of defects in the carbon structure.

Any graphitic material having a value of R smaller than 0.35 is deficient in defects introduced thereinto; therefore, it decreases in discharging capacity after repeated charging and discharging, as mentioned above. Any graphitic material having a value of d(002) larger than 3.365 Å decreases in charging and discharging capacity. Both cases are undesirable.

Consequently, the sixth aspect of the present invention specifies that the graphitic material obtained by heat treatment from a carbonaceous material containing boron or a boron compound should have a value of d(002) no larger than 3.365 Å and a value of R no smaller than 0.35. It also specifies a nonaqueous electrolyte secondary battery whose positive electrode is formed from the thus specified graphitic material.

The positive electrode material obtained in this manner is mixed and molded with a conductor and a binder to form the positive electrode mix, which is finally built into the battery. It seems that the positive electrode material of the present invention is inherently highly conductive and hence needs no conductor; however, it may be optionally incorporated with a conductor according to the use of the battery.

A variety of graphitic materials and carbon black have been widely used as a conductor for the ordinary nonaqueous electrolyte secondary battery containing a lithium salt dissolved therein. In the case of the nonaqueous electrolyte secondary battery pertaining to the present invention, the graphitic material functions as the positive electrode and hence it is not desirable to use it as a conductor. It is desirable to use conductive carbon black instead.

The carbon black that can be used for this purpose includes channel black, oil furnace black, lamp black, thermal black, acetylene black, and Ketjen black carbon black (except for acetylene black) should be purified before use because it is produced from petroleum pitch or coal tar pitch which contains sulfur compounds or nitrogen compounds as impurities. Acetylene black, which is produced solely from acetylene by continuous pyrolysis, is desirable because its freedom from impurities and its highly developed chain structure which leads to good liquid retention and low electrical resistance.

The graphitic material to the present invention may be mixed with the conductor in any ratio according to the use of the battery. In the case where quick charging characteristics and heavy-load discharging characteristics are required of the completed battery, it is desirable to prepare the positive electrode mix from the graphitic material of the present invention and the conductor in an amount sufficient to impart conductivity. Incorporation with a conductor more than necessary decreases the amount of the positive electrode material (or the boronized graphitic material pertaining to the present invention), which in turn decreases the capacity (volume energy density).

The binder should be one which is insoluble in the electrolyte and has good solvent resistance. It includes fluoroplastics, such as polyvinylidene fluoride (PVdF), polytetrafluoroethylene (PTFE), and polyvinyl fluoride (PVF), and organic polymeric compounds, such as carboxy-methylcellulose, polyimide resin, polyamide resin, polyacrylic acid, and sodium polyacrylate.

As mentioned above, the positive electrode mix is composed of the graphitic material containing a boron compound (as specified in the present invention), a binder, and an optional conductor. These components are mixed and the resulting mixture is molded. The molded product is built into the battery. The molding pressure determines the porosity of the positive electrode mix, as a matter of course.

The present inventors investigated the relation between the porosity of the positive electrode mix and the charging-discharging characteristic. This investigation revealed that the charging-discharging characteristic of the graphitic material pertaining to the present invention is greatly affected by the porosity of the mix. Consequently, the seventh aspect of the present invention specifies that the positive electrode mix, which is prepared from the above-mentioned boronized graphitic material, should have a porosity of 0.2-0.6 (measured after it has been molded and built into the battery).

If the positive electrode mix is composed of n components, its porosity is calculated from the following equation.

$$\text{Porosity} = 1 - \Sigma(1/d(i) \times c(i)/100) \times (\text{apparent density})$$

where, $c(i)$ denotes the mixing ratio (in wt %) of the ith components and $d(i)$ denotes the true density (g/cm$^3$) of the ith component.

If components and their mixing ratios and their true densities are given as shown in Table 1, the porosity of the positive electrode is calculated from the equation below.

TABLE 1

| Components | Mixing ratio (wt %) | True density (g/cm$^3$) |
|---|---|---|
| a | c1 | d1 |
| b | c2 | d2 |
| c | c3 | d3 |
| d | c4 | d4 |

$$(\text{Porosity}) = 1 - ((1/d1) \times c1/100 + (1/d2) \times c2/100 + (1/d3) \times c3/100 + (1/d4) \times c4/100) \times d$$

Incidentally, the apparent density d (g/cm$^3$) is that of the positive electrode mix, and it is calculated from the equation below.

$$\text{Apparent density} = w/t \text{ (g/cm}^3\text{)}$$

where, w (g/cm$^2$) stands for the weight of the positive electrode mix per cm$^2$, and t (cm) stands for the apparent thickness of the positive electrode mix.

The porosity of the positive electrode mix pertaining to the present invention is calculated as mentioned above; it ranges from 0.2 to 0.6. With a porosity lower than 0.2, the positive electrode mix is poor in cycle characteristics. With a porosity higher than 0.6, the positive electrode mix (or the graphitic material pertaining to the present invention) is filled in a less amount although it poses no problem with the cycle characteristics, which lowers the capacity (volume energy density).

On the other hand, the negative electrode may be formed from any material capable of electrochemically occluding and releasing lithium ions. Such materials include metallic lithium, lithium aluminum alloy, graphitic material, easily graphitizable carbonaceous material, hardly graphitizable carbonaceous material, niobium pentoxide (Nb$_2$O$_5$), lithium titanate (Li$_{4/3}$Ti$_{5/3}$O$_4$), silicon monoxide (SiO), tin monoxide (SnO), tin-lithium complex oxide (Li$_2$SnO$_3$), and lithium-phosphorus-boron complex oxide (such as LiP$_{0.4}$B$_{0.6}$O$_{2.9}$).

Of these examples, carbonaceous materials (such as graphitic material, easily graphitizable carbonaceous material, and hardly graphitizable carbonaceous material) are highly effective in the present invention because they work at a base potential for highly reversible occlusion and release of lithium with a high capacity. The graphitic materials include various kinds of natural graphite, synthetic graphite, and exfoliated graphite, which are adequately crushed. The carbonaceous material includes carbonized mesophase carbon microbeads, carbon fiber derived from mesophase pitch, carbon fiber grown from gas phase, pyrolyzed carbon, petroleum coke, pitch coke, and needle coke, which may be converted into synthetic graphitic material by graphitization. They may be used in combination with one another. The boronized graphitic material specified in the present invention may also be used as the negative electrode. Any of the above-mentioned materials is mixed with a binder and an optional conductor and the resulting mixture is formed in the negative electrode mix, which is finally built into the battery. The binder and conductor used for the negative electrode are the same as those used for the positive electrodes as exemplified above.

The nonaqueous electrolyte may be exemplified by a nonaqueous electrolyte composed of an organic solvent and a lithium salt dissolved therein and a solid electrolyte composed of a lithium ion conducting solid substance and a lithium salt dissolved therein.

The nonaqueous electrolyte is prepared by dissolving a lithium salt in an organic solvent. The organic solvent and the lithium salt which are commonly used for the battery of this kind may be used without any restrictions. Examples of the organic solvent include propylene carbonate (PC), ethylene carbonate (EC), butylenes carbonate (BC), γ-butyrolactone (GBL), vinylene carbonate (VC), acetonitrile (AN), dimethyl carbonate (DMC), diethyl carbonate (DEC), ethyl methyl carbonate (EMC), a derivative thereof, and a mixture thereof. Examples of the lithium salt include LiPF$_6$, LiBF$_4$, LiClO$_4$, LiGaCl$_4$, LiBCl$_4$, LiAsF$_6$, LiSbF$_6$, LiInCl$_4$, LiSCN, LiBrF$_4$, LiTaF$_6$, LiB(CH$_3$)$_4$, LiNbF$_6$, LiIO$_3$, LiAlCl$_4$, LiNO$_3$, LiI, and LiBr.

The amount of the lithium salt to be dissolved in the organic solvent should be 0.5-4.0 (mol/L), preferably 0.8-3.5 (mol/L), and more preferably 1.0-3.0 (mol/L), as in the case of the conventional nonaqueous electrolyte secondary battery.

The positive electrode and negative electrode which have been constructed as mentioned above are arranged in a tightly sealed container, with a nonaqueous electrolyte (containing a lithium salt dissolved therein) interposed between them. In this way there is obtained the nonaqueous electrolyte secondary battery of the present invention. The present inventors found that the charging-discharging efficiency in the initial cycle greatly varies depending on the arrangement of the positive and negative electrodes. This finding led to the eighth aspect of the present invention.

The eighth aspect of the present invention resides in a nonaqueous electrolyte secondary battery having an electrode assembly which is arranged, together with a nonaqueous electrolyte containing a lithium salt, in a sealed container, said electrode assembly being composed of a positive electrode and a negative electrode which are laminated one over another with a separator interposed between them, said positive electrode being formed into a sheet from a positive electrode mix prepared mainly from the boronized graphitic material pertaining to any of the first to seventh aspects of the present invention, said negative electrode being formed into a sheet from a negative electrode mix prepared mainly from a carbonaceous material capable of occluding and releasing lithium, wherein the positive electrode and the negative electrode are arranged, with a separator interposed between them, in such a way that the periphery of the plane of the negative electrode facing to the positive electrode, said plane being projected to the plane of the positive electrode facing to the negative electrode, is surround by the periphery of the plane of the positive electrode facing to the negative electrode. The separator herein is an insoluble porous membrane impregnated with a nonaqueous electrolyte containing a lithium salt dissolved therein, or a solid electrolyte membrane containing a lithium salt dissolved therein.

In the case where the negative electrode is formed from a carbonaceous material capable of occluding and releasing lithium, a certain amount of irreversible capacity occurs in the initial cycle regardless of the kind of the carbonaceous material used. The phenomenon is known. Even in the case where the negative electrode is combined with the positive electrode of the present invention, an irreversible capacity of this kind occurs in the initial cycle. The magnitude of the irreversible capacity greatly varies depending on the shape and arrangement of the positive electrode.

Figure 1B:
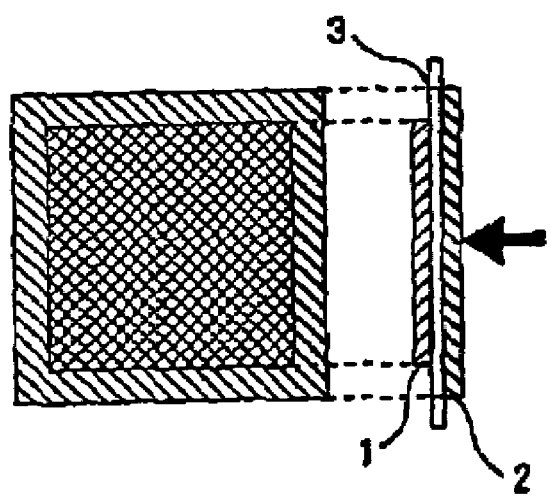
Figure 1C:
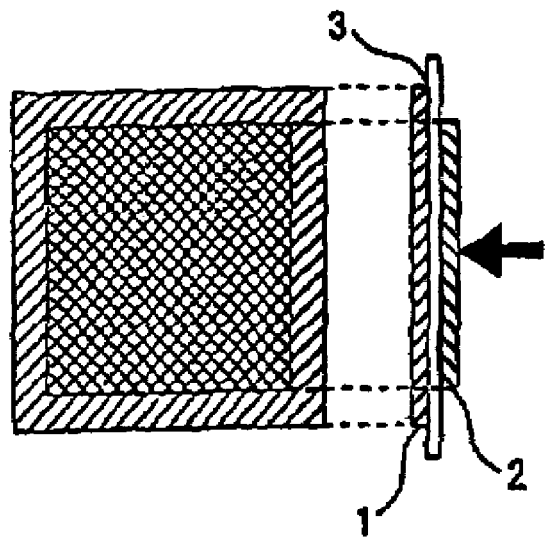

FIGS. 1A-1C are schematic diagrams showing the electrode assembly in which the positive electrode 1 (in sheet form) and the negative electrode 2 (in sheet form) are laminated one over another, with the separator 3 interposed between them. FIG. 1B represents the case in which the periphery of the plane of the negative electrode facing to the positive electrode, said plane being projected to the plane of the positive electrode facing to the negative electrode, is surround by the outside periphery of the plane of the positive electrode facing to the negative electrode. In this case, in which the plane of the negative electrode has a projecting part in the entire region of the periphery of the plane of the negative electrode facing to the positive electrode, said plane being projected to the plane of the positive electrode facing to the negative electrode, there occurs a large irreversible capacity (due to the negative electrode) in the first cycle, which impairs the charging-discharging efficiency, which in turn decreases the battery capacity. By contrast, in the case shown in FIG. 1A, the periphery of the plane of the negative electrode facing to the positive electrode, said plane being projected to the plane of the positive electrode facing to the negative electrode, coincides with the periphery of the plane of the positive electrode facing to the negative electrode. In the case where the positive and negative electrodes are arranged in this manner, there occurs a smaller irreversible capacity than in the case shown in FIG. 1B.

One way to minimize the irreversible capacity and maximize the initial charging-discharging capacity is to arrange the positive and negative electrodes such that the periphery of the plane of the negative electrode facing to the positive electrode, said plane being projected to the plane of the positive electrode facing to the negative electrode, is surround by the periphery of the plane of the positive electrode facing to the negative electrode, as shown in FIG. 1C. In this case where the positive electrode has a projecting part in the entire region of the periphery of the negative electrode facing to the positive electrode, said plane being projected to the plane of the positive electrode facing to the negative electrode, it is possible to keep minimal the irreversible capacity what is important is the presence of the projecting part, and the area of the projecting part does not matter.

The foregoing is concerned with how the positive and negative electrode are arranged in the case where the positive electrode (in sheet form) and the negative electrode (in sheet form) are laminated one over another, with a separator interposed between them. In the case where the electrode assembly (in laminated form) is wound and placed in a sealed container, an alternative contrivance is necessary to improve the charging-discharging efficiency in the initial cycle. This is specified by the ninth aspect of the present invention.

The ninth aspect of the present invention resides in a nonaqueous electrolyte secondary battery provided with a wound electrode assembly consisting of a beltlike positive electrode formed from a positive electrode mix composed mainly of the boronized graphitic material specified in the first to seventh aspects of the present invention, a beltlike negative electrode formed from a negative electrode mix composed mainly of a carbonaceous material capable of occluding and releasing lithium, and a beltlike separator interposed between them, said positive electrode, said negative electrode, and said separator being spirally wound in their lengthwise direction, wherein the negative electrode has a region within its innermost winding region and also has a first margin in the lengthwise direction facing to the inner periphery of the winding part such that it projects from the end at the innermost winding region of the negative electrode, and a second margin in the lengthwise direction facing to the outer periphery of the winding part such that it projects from the end at the outermost winding region of the negative electrode, and a third margin and a fourth margin are formed such that the ends in the widthwise direction of the positive electrode project from both ends positioned in the widthwise direction of the negative electrode over the entire region in the lengthwise direction of the negative electrode. Incidentally, the separator mentioned above denotes an insoluble porous membrane impregnated with a nonaqueous electrolyte containing a lithium salt dissolved therein, or a solid electrolyte membrane containing a lithium salt dissolved therein.

Figure 2:
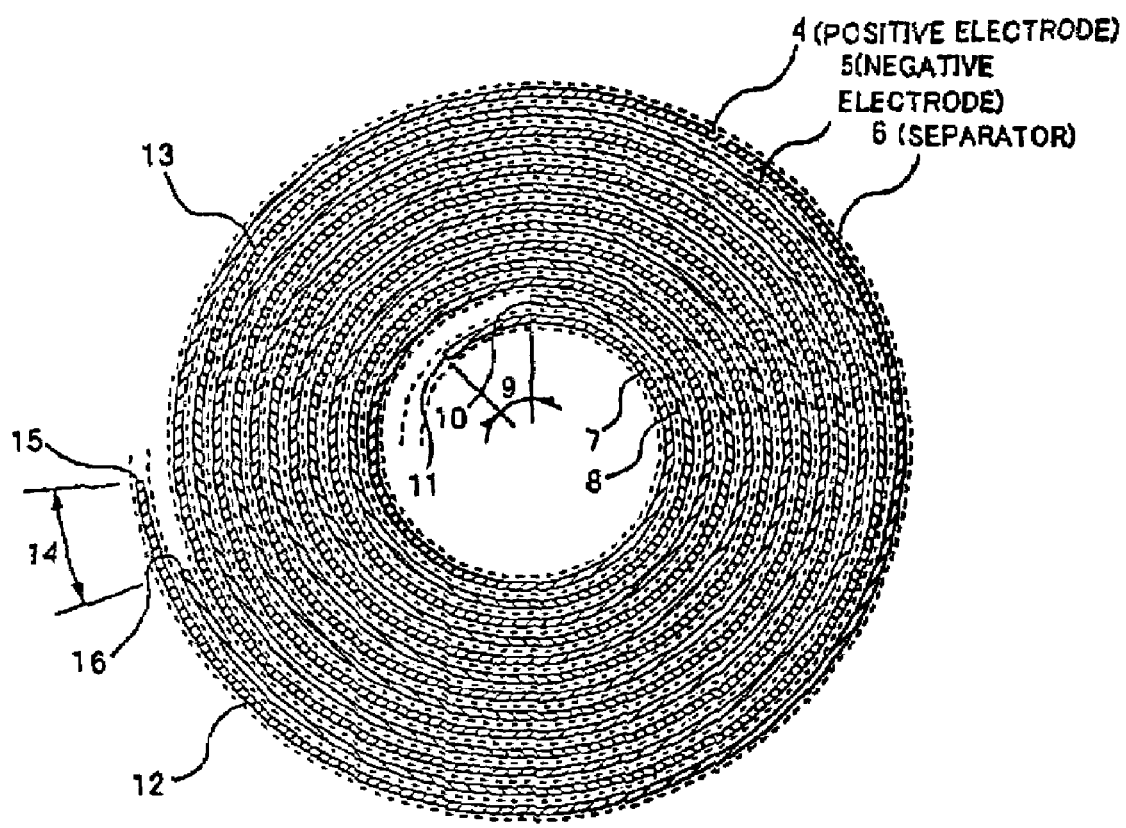
FIG. 2 is a schematic sectional view showing the wound electrode assembly to which the present invention is applied.

The invention will be described with reference to FIGS. 2 to 4. FIG. 2 is a schematic sectional view showing the wound electrode assembly to which the ninth aspect of the present invention is applied. There are shown in FIG. 2 a beltlike positive electrode 4, a beltlike negative electrode 5, and a separator 6. The beltlike negative electrode 5 has its innermost winding part 8. Inside this region, the beltlike positive electrode 4 has its innermost winding part 7. The innermost winding part 7 had a margin 9 extending in its lengthwise direction toward the inner periphery such that the end 11 of the winding part 7 projects from the end 10 at the innermost winding part 8 of the beltlike negative electrode. Outside the outermost winding part 13 of the negative electrode, there is a winding part 12 of the positive electrode. There is also formed a margin 14 in the lengthwise direction toward the outer periphery of the winding part 12 such that the end 15 of the winding part projects from the end 15 positioned at the outermost winding part of the negative electrode.

Figure 3:
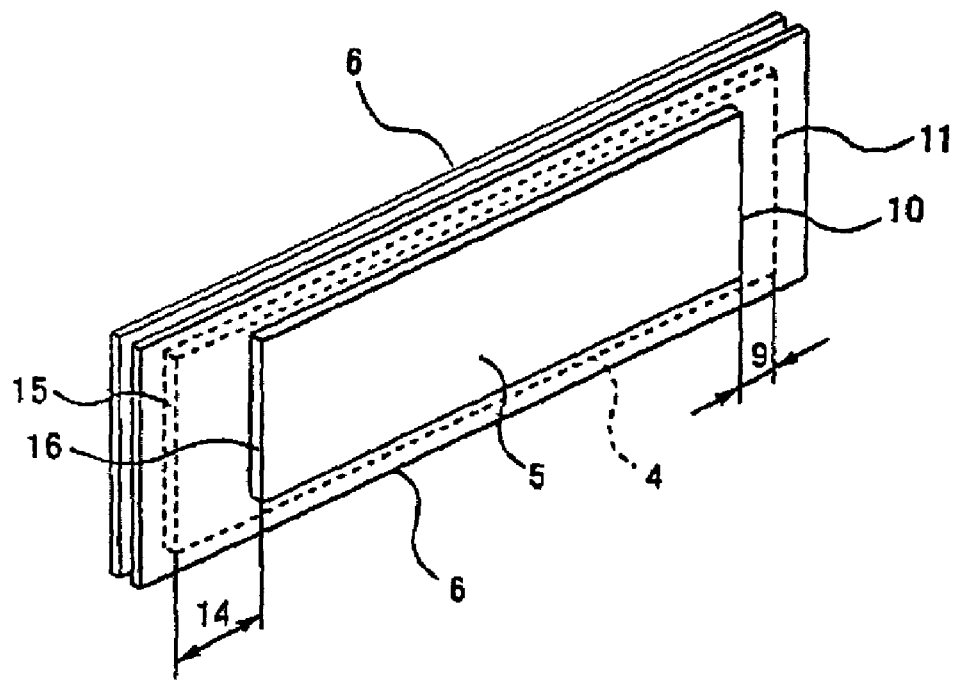
FIG. 3 is a perspective view showing the positions of the positive and negative electrodes and the separator which have been arranged before the wound electrode assembly is formed.
Figure 4:
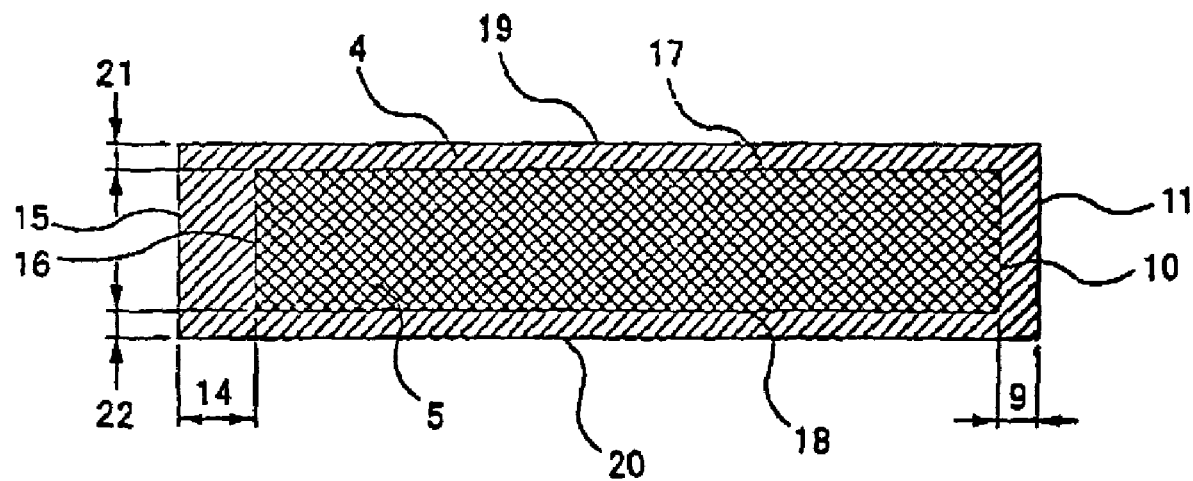
FIG. 4 is a diagram illustrating the arrangement of the positive and negative electrodes, with the separator shown in FIG. 3 omitted, in which the negative electrode is projected onto the plane of the positive electrode which faces to the negative electrode.

FIG. 3 is a perspective view showing the positions of the positive and negative electrodes and the separator which have been arranged before the wound electrode assembly is formed. The broken lines show the positive electrode which is screened by the separator. FIG. 4 is a diagram illustrating the arrangement of the positive electrode 4 and the negative electrode 5, with the separator shown in FIG. 3 omitted. In FIG. 4, there are shown margins 21 and 22 which are formed such that the ends 19 and 20 in the widthwise direction of the positive electrode 4 project from the ends 17 and 18 positioned in the widthwise direction of the negative electrode 5 over the entire region in the lengthwise direction of the negative electrode.

Owing to the above-mentioned structure, the negative electrode in the wound electrode assembly is covered by the positive electrode over its entire region. Consequently, the wound electrode assembly, too, produces the same effect as produced by the electrode assembly defined by the eighth aspect of the present invention.

[Preparation of Graphitic Materials]

Graphitic Materials, Group A

A mixture was prepared from isoviolanthrone (from Tokyo Kasei) and 9,10-dihydroanthracene (from Tokyo Kasei) in a molar ratio of 1.1 This mixture was thoroughly mixed with polyphosphoric acid (from Merck) in a ratio of 1:15 by weight. The resulting mixture was heated to 150° C. and then kept at this temperature for 5 hours in an atmosphere of nitrogen. It was neutralized with a solution of ammonium hydrogen carbonate and then allowed to cool. Thus there was obtained a condensable polycyclic polynuclear aromatic compounds. This compound was placed in a graphite crucible, which was then placed in an electric furnace. It was heated in two stages as follows in an atmosphere of nitrogen. Up to 350° C. at a rate of 70° C./hour, and held for 15 hours. Up to 700° C. at a rate of 70° C./hour, and held for 1 hour.

After heating, the sample was allowed to cool to room temperature under a nitrogen stream. Thus, there was obtained a carbon precursor. It was roughly crushed by a stamp mill and then finely ground by a vibration disk mill. A fraction of the powder was collected which passed through a #391 mesh sieve (with an opening of 38 μm). This powder was mixed with boron carbide powder ($B_4C$, "Dekaboron" from Denki Kagaku Kogyo) passing through a #330 mesh sieve (with an opening 45 μm). The mixing ratio was adjusted so that the amount of boron in the mixture was 0-27 wt %. The resulting mixture was placed in a graphite crucible, which was then placed in an electric furnace. For carbonization or graphitization, it was heated in an atmosphere of argon at a rate of 10° C./minute and kept at the maximum temperature of 1200-2900° C. for 1 hour. The thus obtained carbonaceous material was roughly crushed by a stamp mill (if necessary) and then finely ground by a jet mill. A fraction of the powder was collected which passed through a #391 mesh sieve (with an opening of 38 μm). The collected powder was used as the sample.

Graphitic Materials, Group B

A mixture was prepared from synthetic graphite powder (SFG-6 grade, from Timcal. Japan) and boron oxide powder ($B_2O_3$) passing through a #391 mesh sieve (with an opening of 38 μm). The mixing ratio was such that the boron content in the mixture was 5 wt %. This mixture was placed in a graphite crucible, which was then placed in an electric furnace. It was heated in an atmosphere of argon at a rate of 100° C./minute and kept at the maximum temperature of 2800° C. for 1 hour. The thus obtained graphitic material was roughly crushed by a stamp mill and then finely ground by a vibration disk mill. A fraction of the powder was collected which passed through a #391 mesh sieve (with an opening of 38 μm). The same procedure as above was repeated except that SFG-6 powder was used as such.

Table 2 shows the temperature of heat treatment, the amount of boron added, and the amount of boron remaining after heat treatment, which are relevant to the graphitic materials, groups A and B.

TABLE 2

Physical properties of graphitic materials and charging-discharging characteristics of test cells

| Test cell No. | Sample No. | Graphite Group | Graphitizing temperature (° C.) | Boron source added | Boron content* (wt %) | d(002) (Å) | R value | Residual boron** (wt %) | Electrolyte | Charging voltage (V) | Discharging capacity after one cycle (mAh/g) | Discharging capacity after 10 cycles (mAh/g) | Retention of capacity (%) |
|---|---|---|---|---|---|---|---|---|---|---|---|---|---|
| 1 | 1 | A | 2900 | — | — | 3.370 | 0.24 | 0 | 2M $LiClO_4$/PC | 4.80 | 17.8 | 8.6 | 48.3 |
| 2 | 2 | A | 2900 | $B_4C$ | 0.02 | 3.363 | 0.35 | 0.02 | 2M $LiClO_4$/PC | 4.90 | 24.1 | 22.5 | 93.4 |
| 3 | 3 | A | 2900 | $B_4C$ | 0.08 | 3.357 | 0.55 | 0.05 | 2M $LiClO_4$/PC | 4.90 | 27.8 | 28.3 | 101.8 |
| 4 | 4 | A | 2900 | $B_4C$ | 2 | 3.351 | 0.68 | 1.07 | 2M $LiClO_4$/PC | 4.90 | 31.4 | 32.1 | 102.2 |
| 5 | 5 | A | 2900 | $B_4C$ | 5 | 3.349 | 0.76 | 3.28 | 2M $LiClO_4$/PC | 4.90 | 32.2 | 33.2 | 103.1 |
| 6 | 6 | A | 2900 | $B_4C$ | 10 | 3.350 | 0.81 | 4.74 | 2M $LiClO_4$/PC | 4.90 | 33.5 | 34.7 | 103.6 |
| 7 | 7 | A | 2900 | $B_4C$ | 15 | 3.351 | 0.84 | 7.63 | 2M $LiClO_4$/PC | 4.90 | 33.2 | 34.1 | 102.7 |
| 8 | 8 | A | 2900 | $B_4C$ | 20 | 3.352 | 0.81 | 10.98 | 2M $LiClO_4$/PC | 4.90 | 30.5 | 31.6 | 103.6 |
| 9 | 9 | A | 2900 | $B_4C$ | 27 | 3.354 | 0.83 | 12.60 | 2M $LiClO_4$/PC | 4.90 | 23.4 | 22.9 | 97.9 |
| 10 | 10 | A | 1200 | $B_4C$ | 1 | 3.371 | 0.94 | 0.91 | 2M $LiClO_4$/PC | 4.90 | 23.6 | 22.8 | 96.6 |
| 11 | 11 | A | 1500 | $B_4C$ | 1 | 3.365 | 0.89 | 0.88 | 2M $LiClO_4$/PC | 4.90 | 27.5 | 28.2 | 102.5 |
| 12 | 12 | A | 2300 | — | — | 3.421 | 0.60 | 0 | 2M $LiClO_4$/PC | 4.80 | 7.2 | 2.6 | 36.1 |
| 13 | 13 | A | 2600 | — | — | 3.379 | 0.44 | 0 | 2M $LiClO_4$/PC | 4.80 | 9.1 | 3.7 | 40.7 |
| 14 | 14 | B | — | — | — | 3.357 | 0.18 | 0 | 2M $LiClO_4$/PC | 4.80 | 19.4 | 3.2 | 16.5 |
| 15 | 15 | B | 2800 | $B_2O_3$ | 5 | 3.353 | 0.64 | 1.58 | 2M $LiClO_4$/PC | 4.90 | 33.6 | 37.4 | 111.3 |
| 16 | 5 | A | 2900 | $B_4C$ | 5 | 3.349 | 0.76 | 3.28 | 2M $LiPF_8$/PC | 5.05 | 39.7 | 48.0 | 120.9 |
| 17 | 5 | A | 2900 | $B_4C$ | 5 | 3.349 | 0.76 | 3.28 | 2M $LiPF_4$/PC | 5.10 | 27.3 | 27.8 | 101.8 |
| 18 | 14 | B | — | — | — | 3.357 | 0.18 | 0 | 2M $LiPF_9$/PC | 4.80 | 21.6 | 14.7 | 68.1 |
| 19 | 14 | B | — | — | — | 3.357 | 0.18 | 0 | 2M $LiBF_4$/PC | 4.80 | 22.9 | 19.2 | 83.8 |
| 20 | 14 | B | — | — | — | 3.357 | 0.18 | 0 | 2M $LiClO_4$/PC | 5.00 | 27.8 | 1.2 | 4.3 |
| 21 | 14 | B | — | — | — | 3.357 | 0.18 | 0 | 2M $LiPF_4$/PC | 5.00 | 23.9 | 0.9 | 3.8 |
| 22 | 14 | B | — | — | — | 3.357 | 0.18 | 0 | 2M $LiBF_4$/PC | 5.00 | 35.4 | 7.7 | 21.8 |

*The ratio of boron source added, in terms of boron.
**The amount of boron remaining after graphitization.

Graphitic Materials, Group C

A mixture was prepared from anthracene (from Tokyo Kasei) and benzaldehyde (from Kanto Kagaku) in a molar ratio of 1:1.5. This mixture was mixed with 6.0 wt % of p-toluenesulfonic acid monohydrate (from Kanto Kagaku). The mixture was heated with stirring at 160° C. for 1 hour in a nitrogen stream.

The thus obtained condensable polycyclic polynuclear aromatic compound was placed in a graphite crucible, which was then placed in an electric furnace. It was heated in two stages as follows in an atmosphere of nitrogen.
Up to 350° C. at a rate of 70° C./hour, and held for 15 hours.
Up to 700° C. at a rate of 70° C./hour, and held for 1 hour.

After heating, the sample was allowed to cool to room temperature under a nitrogen stream. The resulting carbon precursor was roughly crushed by a stamp mill and then finely ground by a vibration disk mill. A fraction of the powder was collected which passed through a #391 mesh sieve (with an opening of 38 μm). This powder was mixed with boron oxide powder ($B_2O_3$, from Kanto Kagaku) and silicon oxide power ($SiO_2$, from Kanto Kagaku), both passing through a #330 mesh sieve (with an opening 45 μm). The mixing ratio was varied. The resulting mixture was placed in a graphite crucible, which was then placed in an electric furnace. It was heated in an atmosphere of argon at a rate of 10° C./minute and kept at the maximum temperature of 2800° C. for 5 hours. The thus obtained carbonaceous material was roughly crushed by a stamp mill (if necessary) and then finely ground by a jet mill. A fraction of the powder was collected which passed through a #391 mesh sieve (with an opening of 38 μm). The same procedure as above was repeated for carbonization and graphitization without silicon oxide powder. Table 3 shows the temperature of heat treatment and the amount of boron and silicon remaining after heat treatment, which are relevant to the graphitic materials obtained as mentioned above.

Graphitic Materials, Group D

The procedure for the graphitic materials, group C, was repeated to prepare the condensable polycyclic polynuclear aromatic compound. It was placed in a graphite crucible, which was then placed in an electric furnace. It was heated in two stages as follows in an atmosphere of nitrogen.
Up to 350° C. at a rate of 70° C./hour, and held for 15 hours.
Up to 700° C. at a rate of 70° C./hour, and held for 1 hour.

After heating, it was allowed to cool to room temperature under a nitrogen stream. The resulting carbon precursor was roughly crushed by a stamp mill and then finely ground by a vibration disk mill. A fraction of the powder was collected which passed through a #391 mesh sieve (with an opening of 38 μm). This powder (85 parts by weight) was mixed with 11 parts by weight of boron oxide powder ($B_2O_3$, from Kanto Kagaku) and 4 parts by weigh of silicon oxide power ($SiO_2$, from Kanto Kagaku), both passing through a #330 mesh sieve (with an opening 45 μm). The resulting mixture was mixed with coal tar pitch (in pellet form, from Kansai Netsukagaku) in a ratio of 1:1 by weight. Mixing was continued at 160° C. for 2 hours, and the resulting mixture was allowed to cool to room temperature. The mixture was formed into a block by cold isostatic pressing (CIP). The resulting molded product was heated at 1000° C. for 1 hour in an argon stream and then graphitized at 2800° C. for 5 hours. The thus obtained carbonaceous material was roughly crushed by a stamp mill and then finely ground by a jet mill. A fraction of the powder was collected which passed through a #391 mesh sieve (with an opening of 38 μm). The collected powder was used as the sample. Table 3 shows the temperature of heat treatment and the amount of boron and silicon remaining after heat treatment, which are relevant to the graphitic materials obtained as mentioned above.

TABLE 3

Physical properties of graphitic materials, groups C, D and E, and charging-discharging characteristics of test cells

| Test cell No. | Sample No. | Graphite group | Boron remaining after graphitization (wt %) | Silicon remaining after graphitization (wt %) | d(002) (Å) | R value | Discharging capacity after one cycle (mAh/g) | Discharging capacity after 500 cycles (mAh/g) | Retention of capacity (%) |
|---|---|---|---|---|---|---|---|---|---|
| 23 | 23 | C | 0.5 | 0 | 3.362 | 0.53 | 38.4 | 36.4 | 94.8 |
| 24 | 24 | C | 0.5 | 0.01 | 3.362 | 0.54 | 42.2 | 40.5 | 96.0 |
| 25 | 25 | C | 0.5 | 1.94 | 3.364 | 0.59 | 45.3 | 43.9 | 96.9 |
| 26 | 26 | C | 0.5 | 4.98 | 3.365 | 0.58 | 41.6 | 40.3 | 96.9 |
| 27 | 27 | C | 1.92 | 0 | 3.351 | 0.62 | 42.8 | 41.2 | 96.3 |
| 28 | 28 | C | 1.98 | 0.01 | 3.356 | 0.65 | 46.9 | 45.4 | 96.8 |
| 29 | 29 | C | 2.11 | 1.87 | 3.600 | 0.69 | 48.5 | 47.2 | 97.3 |
| 30 | 30 | C | 2.05 | 5.06 | 3.600 | 0.69 | 45.4 | 44.2 | 97.4 |
| 31 | 31 | C | 6.37 | 0 | 3.348 | 0.81 | 45.3 | 43.9 | 96.9 |
| 32 | 32 | C | 6.42 | 0.01 | 3.350 | 0.85 | 48.2 | 46.9 | 97.3 |
| 33 | 33 | C | 6.53 | 2.11 | 3.358 | 0.88 | 51.4 | 50.3 | 97.9 |
| 34 | 34 | C | 6.48 | 5.05 | 3.358 | 0.88 | 47.6 | 46.6 | 97.9 |
| 35 | 35 | C | 10.82 | 0 | 3.353 | 0.80 | 40.6 | 39.4 | 97.0 |
| 36 | 36 | C | 10.98 | 0.01 | 3.355 | 0.81 | 42.7 | 41.6 | 97.4 |
| 37 | 37 | C | 10.92 | 1.79 | 3.357 | 0.82 | 43.4 | 42.3 | 97.5 |
| 38 | 38 | C | 11.06 | 5.03 | 3.358 | 0.82 | 41.9 | 40.9 | 97.6 |
| 39 | 39 | D | 2.08 | 1.76 | 3.358 | 0.72 | 55.3 | 54.9 | 99.3 |
| 40 | 40 | E | 2.15 | 0 | 3.353 | 0.68 | 44.6 | 44.3 | 99.3 |

Graphitic Materials, Group E

The procedure for the graphitic materials, group C, was repeated to prepare the condensable polycyclic polynuclear aromatic compound. It was placed in a graphite crucible, which was then placed in an electric furnace. It was heated in two stages as follows in an atmosphere of nitrogen.
Up to 350° C. at a rate of 70° C./hour, and held for 15 hours.
Up to 700° C. at a rate of 70° C./hour, and held for 1 hour.

After heating, it was allowed to cool to room temperature under a nitrogen stream. The resulting carbon precursor was roughly crushed by a stamp mill and then finely ground by a vibration disk mill. A fraction of the powder was collected which passed through a #391 mesh sieve (with an opening of 38 μm). This powder (90 parts by weight) was mixed with 10 parts by weight of boron oxide powder ($B_2O_3$, from Kanto Kagaku) passing through a #330 mesh sieve (with an opening of 45 μm). The resulting mixture was mixed with a 2 wt % aqueous solution of carboxy-methylcellulose (Celogen 4H, from Dai-ichi Seiyaku) in a ratio of 1:1 by weight. The mixture was kneaded with distilled water in an automatic mortar for 1 hour. The resulting mixture in slurry form was poured into a polypropylene container, which was allowed to stand in a hot-air drier at 60° C. for 1 week, so that the slurry was evaporated to dryness with the polypropylene container removed, the resulting molded product was heated in an argon stream at 1000° C. for 1 hour. The heat-treated product was graphitized by heating at 2800° C. for 5 hours. The thus obtained carbonaceous material was roughly crushed by a stamp mill and then finely ground by a jet mill. A fraction of the powder was collected which passed through a #391 mesh sieve (with an opening of 38 μm). The collected powder was used as the sample. Table 3 shows the temperature of heat treatment and the amount of boron remaining after heat treatment, which are relevant to the graphitic materials obtained as mentioned above.

Graphitic Materials, Group F

The procedure for production of graphitic material D was repeated except that the grinding by a jet mill (which follows the rough crushing by a stamp mill) was carried out, with the pressure of compressed air varied and the falling speed of powder varied. In addition, classification was carried out according to need. Table 4 shows the particle size distribution of the graphitic materials, group E.

TABLE 4

Particle size distribution of graphitic materials, group F (samples F-1 to F-12), and load characteristics

| Sample | Average particle diameter (μm) | Ratio of particles smaller than 5 μm (%) | Items of evaluation | 1 mA/cm$^2$ | 5 mA/cm$^2$ | 10 mA/cm$^2$ | 20 mA/cm$^2$ | 40 mA/cm$^2$ | 60 mA/cm$^2$ | 80 mA/cm$^2$ | 100 mA/cm$^2$ |
|---|---|---|---|---|---|---|---|---|---|---|---|
| F-1 | 3.3 | 76.4 | Discharging capacity (mAh/g) | 23.8 | 23.1 | 22.4 | 21.9 | 19.9 | 14.9 | 9.0 | 4.7 |
| | | | Retention of capacity (%) | 100.0 | 97.0 | 94.3 | 92.0 | 83.6 | 62.5 | 37.8 | 19.6 |
| F-2 | 6.5 | 35.2 | Discharging capacity (mAh/g) | 25.0 | 24.4 | 24.0 | 23.2 | 21.1 | 16.1 | 10.4 | 5.5 |
| | | | Retention of capacity (%) | 100.0 | 97.6 | 96.0 | 93.1 | 84.4 | 64.6 | 41.8 | 22.0 |
| F-3 | 9.8 | 20.8 | Discharging capacity (mAh/g) | 26.1 | 25.6 | 25.2 | 24.6 | 22.8 | 19.0 | 13.5 | 8.3 |
| | | | Retention of capacity (%) | 100.0 | 98.0 | 96.5 | 94.3 | 87.5 | 72.9 | 51.8 | 31.8 |
| F-4 | 10.0 | 10.0 | Discharging capacity (mAh/g) | 26.5 | 26.0 | 25.5 | 24.9 | 23.5 | 21.3 | 16.6 | 11.5 |
| | | | Retention of capacity (%) | 100.0 | 98.0 | 96.2 | 93.9 | 88.8 | 80.4 | 62.6 | 43.4 |
| F-5 | 13.7 | 15.4 | Discharging capacity (mAh/g) | 25.6 | 25.0 | 24.6 | 24.1 | 22.5 | 18.9 | 14.9 | 9.9 |
| | | | Retention of capacity (%) | 100.0 | 97.7 | 96.2 | 94.1 | 87.9 | 73.9 | 58.2 | 38.7 |
| F-6 | 20.2 | 3.8 | Discharging capacity (mAh/g) | 26.0 | 25.5 | 25.1 | 24.5 | 23.4 | 21.3 | 17.6 | 13.1 |
| | | | Retention of capacity (%) | 100.0 | 98.1 | 96.6 | 94.3 | 89.9 | 82.1 | 67.7 | 50.5 |
| F-7 | 22.0 | 14.9 | Discharging capacity (mAh/g) | 25.8 | 25.2 | 24.9 | 24.3 | 22.7 | 19.3 | 14.6 | 9.1 |
| | | | Retention of capacity (%) | 100.0 | 97.6 | 96.4 | 94.3 | 88.1 | 74.8 | 56.4 | 35.2 |
| F-8 | 37.6 | 5.6 | Discharging capacity (mAh/g) | 26.2 | 25.7 | 25.1 | 24.4 | 23.4 | 21.3 | 16.9 | 12.2 |
| | | | Retention of capacity (%) | 100.0 | 98.1 | 95.7 | 93.2 | 89.2 | 81.3 | 64.6 | 46.7 |
| F-9 | 34.9 | 11.6 | Discharging capacity (mAh/g) | 26.1 | 25.5 | 24.6 | 23.9 | 21.9 | 18.6 | 12.2 | 8.3 |
| | | | Retention of capacity (%) | 100.0 | 97.8 | 94.3 | 91.6 | 84.0 | 71.3 | 46.6 | 31.7 |
| F-10 | 42.5 | 7.8 | Discharging capacity (mAh/g) | 26.0 | 25.4 | 25.1 | 24.5 | 23.3 | 21.2 | 17.1 | 12.7 |
| | | | Retention of capacity (%) | 100.0 | 97.5 | 96.4 | 94.1 | 89.5 | 81.3 | 65.7 | 48.6 |
| F-11 | 60.0 | 3.7 | Discharging capacity (mAh/g) | 25.4 | 24.7 | 24.2 | 23.5 | 21.9 | 20.2 | 15.9 | 10.3 |

TABLE 4-continued

Particle size distribution of graphitic materials, group F (samples F-1 to F-12), and load characteristics

| Sample | Average particle diameter (μm) | Ratio of particles smaller than 5 μm (%) | Items of evaluation | 1 mA/cm$^2$ | 5 mA/cm$^2$ | 10 mA/cm$^2$ | 20 mA/cm$^2$ | 40 mA/cm$^2$ | 60 mA/cm$^2$ | 80 mA/cm$^2$ | 100 mA/cm$^2$ |
|---|---|---|---|---|---|---|---|---|---|---|---|
|  |  |  | Retention of capacity (%) | 100.0 | 97.4 | 95.3 | 92.7 | 86.4 | 79.5 | 62.7 | 40.5 |
| F-12 | 74.1 | 0.9 | Discharging capacity (mAh/g) | 26.1 | 25.6 | 25.2 | 24.6 | 22.8 | 19.0 | 13.5 | 8.3 |
|  |  |  | Retention of capacity (%) | 100.0 | 98.0 | 96.5 | 94.3 | 87.5 | 72.9 | 51.8 | 31.8 |

[Analysis of Graphitic Materials]

(1) Measurement of X-ray Wide-angle Diffraction

Samples of graphitic materials were examined for the interplaner spacing d(002) of the (002) planes by using an X-ray wide-angle diffractometer of Geiger-flex type having a copper anode. Measurements and data calculations were carried out according to the method provided by the Japan Society for the Promotion of Science, Committer 117, Carbon 36, 25 (1963). The sample was thoroughly mixed with high-purity silicon powder (about 15 wt %) as an internal standard substance, and the resulting mixture was packed into a sample cell. X-ray diffraction of the sample was measured by the reflection diffractometer method that uses CuK$_\alpha$ ray (monochromated by a graphite monochromer).

(2) Raman Spectrometry

Samples were analyzed by Raman spectrometry with an argon laser having a wavelength of 5145 Å. This spectrometry involves measurements of intensities Ia and Ib of peaks Pa and Pb which appear respectively in the regions of 1580±100 cm$^{-1}$ and 1360±100 cm$^{-1}$. The R value (which is defined as Ib/Ia) was calculated.

(3) Content of Boron and Silicon in Carbonaceous Materials

Boron in the carbonaceous materials was determined according to JIS-R7223-1997 (Japanese Standards Association). Silicon was determined by the following procedure. A sample [a g] is burnt and ashed in the air at 815° C. The resulting ash is fused with a mixture of sodium peroxide (Na$_2$O$_2$) and sodium carbonate (Na$_2$CO$_3$). The resulting solid is extracted with hydrochloric acid. The residue of extraction is heated together with perchloric acid until fuming occurs. The solids are filtered off and washed. The separated solids are heated at 1100° C. and weighed after cooling. [b g]The thus obtained sample is treated with hydrofluoric acid and then ashed by ignition. After cooling, the resulting ash is weighed. [c g] The content (%) of SiO$_2$ in the ash is calculated from (b−c)/a×100, and this content is converted into the content of silicon (Si) in the carbide.

(4) Measurement of Particle Size Distribution

The content of particles having an average particle diameter and a particle diameter no larger than 5 μm was measured by using an apparatus for measuring particle size distribution by laser diffraction (JEOL/SYMPATEC HELOS).

[Evaluation of Graphitic Materials, Groups a and B, by Means of Test Cells]

A mixture was prepared from a sample of the graphitic material, an aqueous dispersion of PTFE (polytetrafluoroethylene) (30J, from Mitsui-DuPont Fluorochemical), and a 2 wt % aqueous solution of CMC (carboxymethylcellulose) (Celogen 4H, from Dai-ichi Seiyaku), in a ratio of 96:3:1 by weight. This mixture was made into a slurry by dilution with distilled water. Incidentally, the amount of 30J and CMC is based on solids. The thus obtained slurry was applied to one side of an aluminum foil (20 μm thick) by using a doctor blade, such that the amount of the graphitic material per unit area was about 7.0 mg/cm$^2$. The slurry coating was dried at 60° C. for 20 minutes. Thus, there was obtained a sheetlike electrode. This sheet was compressed between pressing dies so that the positive electrode mix has a porosity of about 0.50. The compressed sheet was punched to give small disks, 9 mm in diameter. Each disk was used as the active electrode of the test cell.

Figure 5:
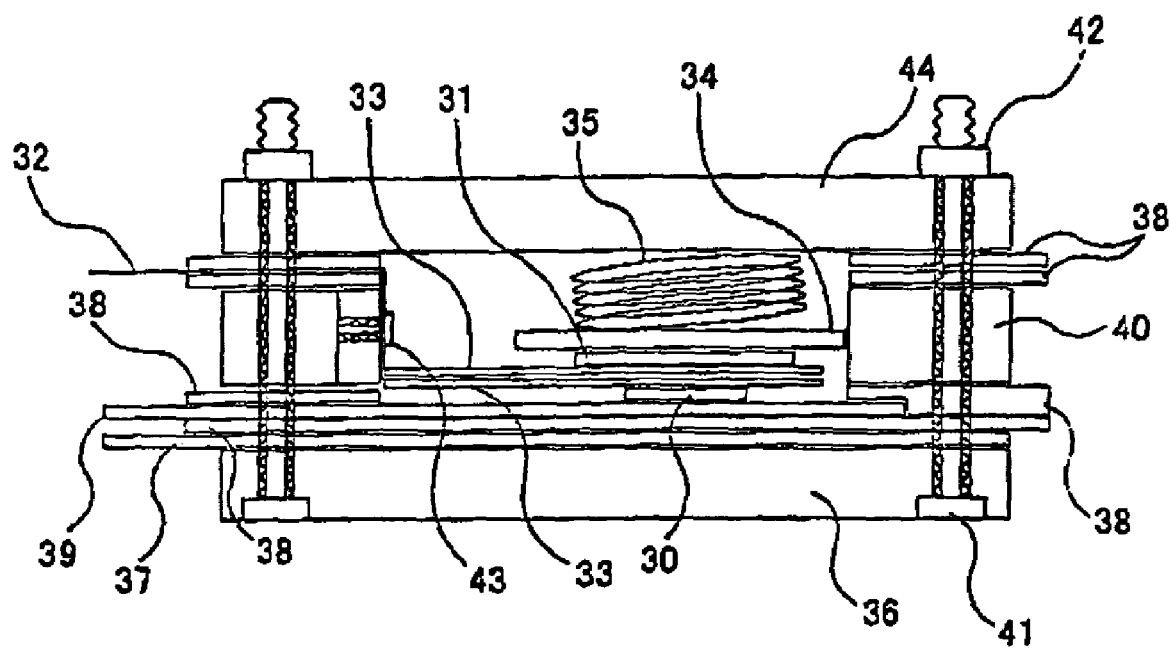
FIG. 5 is a sectional view showing the test cell in the present invention.

FIG. 5 is a sectional view showing the test cell. The test cell has an active electrode, a counter electrode, and a reference electrode. The active electrode is a punched sheet electrode, 9 mm in diameter. Both the counter electrode and the reference electrode are made of metallic lithium. The test cell was assembled in an atmosphere of dry air having a dew point no higher than −40° C., from a sheet electrode, a parafilm, and other plastic and metal parts which had been vacuum-dried at 120° C., 45° C., and 60° C., respectively, for 10 hours or longer. The separator is two pieces of polypropylene nonwoven fabric, 50 μm thick, with a porosity of 78.6%, placed one over another. Between the two nonwoven fabrics is inserted the reference electrode of metallic lithium such that it does not overlap with the counter electrode and active electrode. Prior to assembling, the sheet electrode and separator were individually impregnated with an electrolyte under reduced pressure in a Teflon container. The electrolyte is a solution containing 2 mol/L (2 M hereinafter) of solute dissolved in PC (propylene carbonate). The solute is any one of LiClO$_4$, LiPF$_6$, and LiBF$_4$. After assembling, the test cell underwent the charging-discharging test in a thermostat at 25° C. in the atmosphere.

The charging-discharging test consists of charging with a constant current (adjusted to a current density of 0.1 mA/cm$^2$) until the active electrode reaches a prescribed potential (4.80-5.10 V vs Li$^+$/Li), and discharging at the same current density until the active electrode reaches 3.0 V, with a 5-minute pause placed between charging and discharging. By repeating this charging-discharging cycle 10 times, the charging-discharging curve and capacity were measured. Table 2 shows the discharging capacity after the first cycle and the tenth cycle and the retention of capacity (the ratio of the discharging capacity after the tenth cycle to the discharging capacity after the first cycle).

In this test, the charging voltage ranges from 4.80 to 5.10 (V vs Li$^+$/Li) as mentioned above. This is because the boron-containing graphitic material is noble with respect to the boron-free graphitic material, as explained later. The charging voltage of the boron-free graphitic material is set at 4.8 V, whereas the charging voltage of the boron-containing graphitic material is set at 4.90 V in the case where the electrolyte is 2M LiClO$_4$/PC. The reason for this is that if the charging voltage of the boron-containing graphitic material is set at 4.8 V, the end voltage is reached before full charging is achieved in the first cycle and the discharging capacity is entirely null. Further experiments revealed that the charging-discharging potential of the boron-containing graphitic material is affected by the kind of anions in the electrolyte. For the same reason as mentioned above, the charging voltage was set at 5.05 V or 5.10 V, respectively, in the case where the electrolyte is 2M LiPF$_6$/PC or 2M LiBF$_1$/PC. Incidentally, to see how the boron-containing graphitic material differs from the ordinary boron-free graphitic material in charging-discharging cycles, tests with a charging voltage of 5.0 V were performed on some samples of ordinary graphitic materials.

[Evaluation of Graphitic Materials, Groups C, D, and E, by Means of Test Cells]

Samples of active electrodes were prepared in the same way as in evaluation of graphitic materials, groups A and B. Each active electrode was built into the test cell (shown in FIG. 5) which contains an electrolyte composed of a 1:2 mixed solvent of PC (propylene carbonate) and NEC (methyl ethyl carbonate) and 2 mol/L of LiPF$_6$ dissolved therein. The test cell underwent the charging-discharging test in a thermostat at 25° C. in the atmosphere.

In the first charging-discharging cycle, the test cell was charged at a current of 20 mA/g until a discharging capacity of 80 mAh/g was reached and then the test cell as discharged at a current of 20 mA/g until the potential of the active electrode decreased to 3.0 (V vs Li$^+$/Li) with respect to the reference electrode, with a 1-minute pause placed between charging and discharging. (g denotes the weight of the active electrode in terms of graphite.) This charging-discharging cycle was repeated 9 times.

In the eleventh and subsequent charging-discharging cycles, the test cell was charged at a constant current of 300 mA/g until the potential reached 4.8 (V vs Li$^+$/Li) and then the test cell was discharged at a constant current of 1 mA/cm$^2$ until the potential decreased to 3.0 (V vs Li$^+$/Li), with a 1-minute pause placed between charging and discharging. (g denotes the weight of the active electrode in terms of graphite, and cue denotes the apparent area of the active electrode.) This charging-discharging cycle was repeated 500 times. Table 3 shows the discharging capacity after the first cycle and the 500th cycle and the retention of capacity (the ratio of the discharging capacity after the 500th cycle to the discharging capacity after the first cycle).

[Evaluation of Graphitic Materials, Group F, by Means of Test Cells]

Samples of active electrodes were prepared in the same way as in evaluation of graphitic materials, groups A and B. Each active electrode was built into the test cell (shown in FIG. 5) which contains an electrolyte composed of a 1:2 mixed solvent of PC (propylene carbonate) and MEC (methyl ethyl carbonate) and 2 mol/L of LiClO$_4$ dissolved therein. The test cell underwent the charging-discharging test in a thermostat at 25° C. in the atmosphere.

The test cell shown in FIG. 5 consists of an active electrode 30 (9 mm in diameter, punched from a sheet electrode), a counter electrode of metallic lithium 31, a nickel lead plate 32 (with metallic lithium attached to the end thereof), a polypropylene nonwoven fabric 33, a stainless steel disk 34, a spring 35, a stainless steel support 36, a polypropylene plate 37, a parafilm 38, an aluminum plate 39, a polypropylene spacer block 40, a bolt 41, a nut 42, a bolt 43 (to fix the reference electrode), and a stainless steel support 44.

In the first charging-discharging cycle, the test cell was charged at a current of 20 mA/g until a discharging capacity of 80 mAh/g was reached and then the test cell was discharged at a current of 20 mA/g until the potential of the active electrode decreased to 2.0 (V vs Li$^+$/Li) with respect to the reference electrode, with a 1-minute pause placed between charging and discharging. (g denotes the weight of the active electrode in terms of graphite.) Then, the test cell was charged at a constant current of 20 mA/g until the potential reached 4.7 (V vs Li$^+$/Li) and then the test cell was discharged at a current of 20 mA/g until the potential decreased to 2.0 (V vs Li$^+$/Li), with a 1-minute pause placed between charging and discharging. This charging-discharging cycle was repeated 9 times.

In the eleventh and subsequent charging-discharging cycles, the test cell was tested for load characteristics. First, the test cell was charged at a constant current and at a constant voltage, with the current density being 300 mA/g (in terms of graphite), the charging voltage being 4.7 (V vs Li$^+$/Li), and the charting time being 10 minutes. After 1-minute pause, the test cell was discharged at a current density ranging from 1 to 100 mA/cm$^2$ (based on the apparent area of the active electrode). Table 4 shows the discharging capacity (mAh/g) at each current density and the retention of capacity (the ratio of the discharging capacity at each current density to the discharging capacity at a current density of 1 mA/cm$^2$).

[Charging-discharging Test with a Battery of Test Cell Type]

A mixture was prepared from a sample of the graphitic material, an aqueous dispersion of PTFE (polytetrafluoroethylene) (30J, from Mitsui-DuPont Fluorochemical), and a 2 wt % aqueous solution of CMC (carboxymethylcellulose) (Celogen 4H, from Dai-ichi Seiyaku), in a ratio of 97:1:2 by weight. This mixture was made into a slurry by dilution with distilled water. Incidentally, the amount of 30J and CMC is based on solids. The thus obtained slurry was applied to one side of an aluminum foil (20 μm thick) by using a doctor blade, such that the amount of the graphitic material per unit area was about 8.0 mg/cm$^2$. The slurry coating was dried at 60° C. for 20 minutes. Thus, there was obtained a sheetlike electrode. This sheet was compressed between pressing dies so that the positive electrode mix has a porosity of about 0.50. The compressed sheet was punched to give small disks, A mm in diameter. In this way the positive electrode was obtained.

On the other hand, a mixture was prepared from a fine powder of pitch coke (LPC-A, from Sin-Nittetsu Kagaku), passing through a #391 mesh sieve (with an opening of 38 μm), and a binder of polyvinylidene fluoride PVdF (KF#1100, from Kureha Kagaku) in a ratio of 90:10 by weight. This mixture was mixed with N-methyl-pyrrodin-2-one (NMP, from Mitsubishi Kagaku) into a paste. Thus there was obtained the negative electrode mix in slurry form. The thus obtained slurry was applied to one side of a rolled copper foil (14 μm thick) by using a doctor blade, such that the amount of the carbonaceous material per unit area was about 1.5 mg/cm$^2$. The slurry coating was dried at 60° C. for 20 minutes. Thus, there was obtained a sheetlike electrode. This sheet was compressed between pressing dies so that the mix has a density of about 0.60. The compressed sheet was punched to give small disks, B mm in diameter. In this way the negative electrode was obtained.

Figure 6:
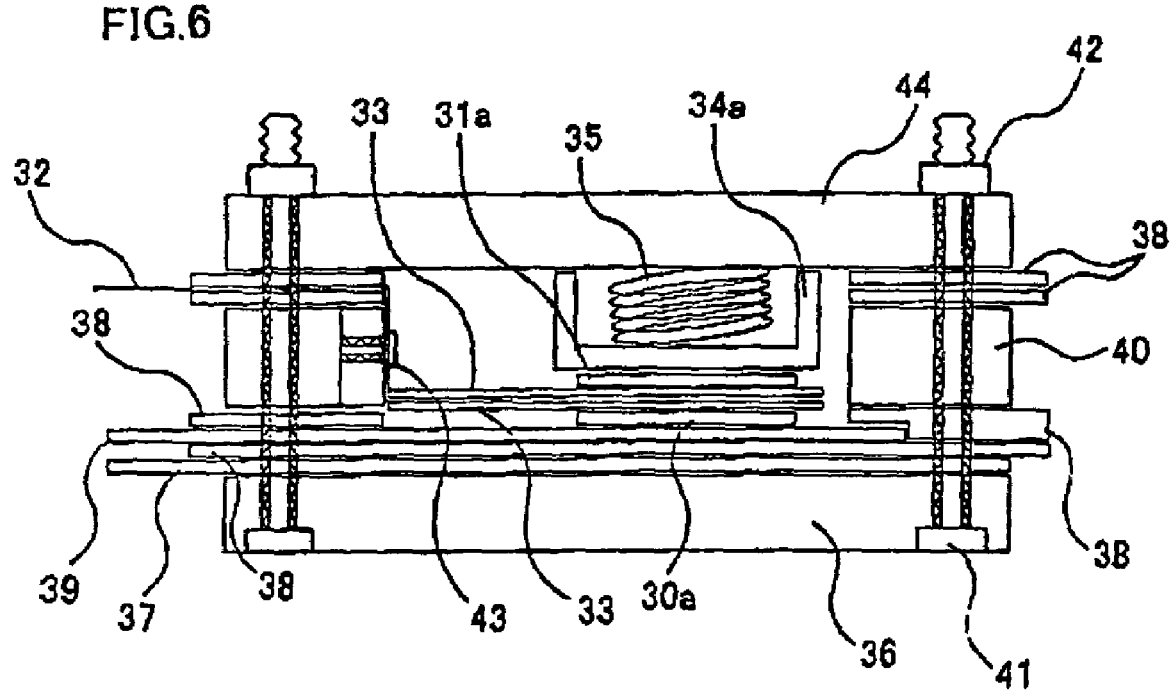
FIG. 6 is a sectional view showing the battery of the test cell type in the present invention.

FIG. 6 is a sectional view showing the battery of test cell. This battery has a positive electrode 31a and a negative electrode 30a which are pressed by a spring 35. These electrodes face each other, with two pieces of polypropylene nonwoven fabrics (50 μm thick and having a porosity of 78.6%) interposed between them. This battery is substantially identical with the battery shown in FIG. 5 in structure except for that mentioned above.

Figure 7A:
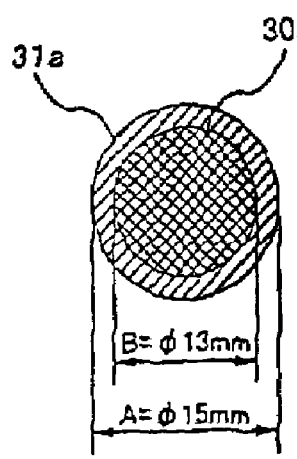
FIGS. 7A-7C are plan views showing the arrangement of the positive and negative electrodes, with the separator omitted, in the test cell shown in FIG. 6.
Figure 7B:
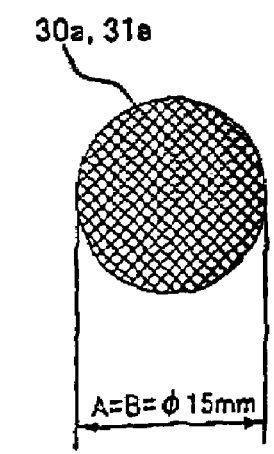
Figure 7C:
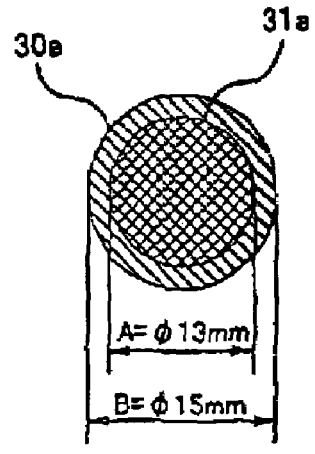

The above-mentioned positive and negative electrodes facing each other are arranged concentrically (with their centers overlapping with each other) as shown in FIGS. 7A-7C. FIG. 7A illustrates an example in which the periphery of the plane of the negative electrode 30a facing to the positive electrode 31a, said plane being projected to the plane of the positive electrode facing to the negative electrode, is surrounded by the periphery of the plane of the positive electrode facing to the negative electrode. FIG. 7B illustrates an example in which the periphery of the plane of the negative electrode 30a facing to the positive electrode 31a, said plane being projected to the plane of the positive electrode facing to the negative electrode, coincides with the periphery of the plane of the positive electrode facing to the negative electrode. FIG. 7C illustrates an example in which the periphery of the plane of the positive electrode 31a facing to the negative electrode 30a, said plane being projected to the plane of the positive electrode facing to the negative electrode, is surrounded by the periphery of the plane of the negative electrode facing to the positive electrode.

The test cell was assembled in an atmosphere of dry air having a dew point no higher than −40° C., from a sheet electrode, a parafilm, and other plastic and metal parts which had been vacuum-dried at 120° C., 45° C., and 60° C., respectively, for 10 hours or longer. As in the test cell mentioned above, the separator is two pieces of polypropylene nonwoven fabric, placed one over another. Between the two nonwoven fabrics is inserted the positive electrode of metallic lithium (as the reference electrode) such that it does not overlap with the negative electrode. The reference electrode was used to monitor the potential of the positive and negative electrodes during charging and discharging, thereby controlling charging and discharging. The electrolyte is a solution containing 2 mol/L of lithium perchlorate $LiClO_4$ dissolved in a 1:2 (by volume) mixed solvent of PC (propylene carbonate) and methyl ethyl carbonate (MEC). After assembling, the battery underwent the charging-discharging test in a thermostat at 25° C. in the atmosphere.

The charging-discharging test consists of charging with a constant current (100 mA/g in terms of the weight of the negative electrode) until the potential of the negative electrode reaches 0 (V vs $Li^+/Li$), and discharging at the same current until the potential of the negative electrode reaches 1.2 (V vs $Li^+/Li$), with a 1-minute pause placed between charging and discharging. By repeating this charging-discharging cycle 10 times, the charging-discharging curve and capacity (in terms of the weight of the negative electrode) were measured. FIGS. 9 to 32 show the charging-discharging curve of each test cell. Table 5 shows the charging-discharging capacity measured in each cycle.

[The Making of Battery]

Figure 8:
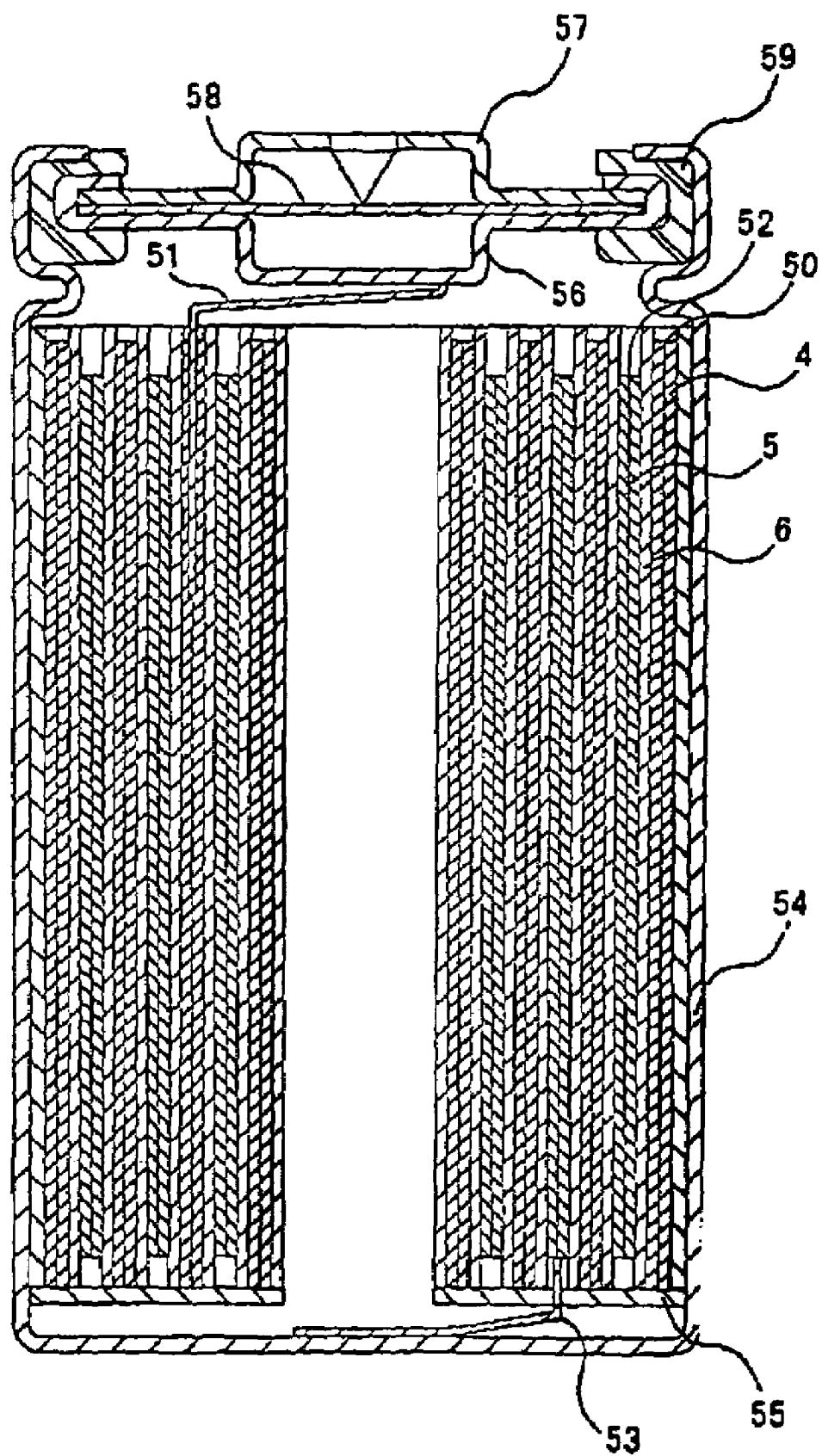
FIG. 8 is a sectional view showing the nonaqueous electrolyte secondary battery having the wound electrodes.

FIG. 8 shows the structure of the nonaqueous electrolyte secondary battery of 18650 size type to which the present invention is applied. In FIG. 8, there is shown a sheet electrode 4 as the positive electrode. A mixture was prepared from the above-mentioned graphitic material (designated as D), an aqueous dispersion of PTFE (polytetrafluoroethylene) (30J, from Mitsui-DuPont Fluorochemical), and a 2 wt % aqueous solution of CMC (carboxymethylcellulose) (Celogen 4H, from Dai-ichi Seiyaku), in a ratio of 97:1:2 by weight. This mixture was mixed with distilled water to give a paste. In this way there was obtained the positive electrode mix in slurry form. The slurry was applied to one side of an aluminum foil (20 μm thick). After drying and rolling, the coated aluminum foil was cut into a sheet electrode, 56 mm wide, which serves as the positive electrode.

The coating step was accomplished such that the amount of the graphitic material per unit area was 7.5 $mg/cm^2$. The rolling step was accomplished, with the spacing of pressing rolls adjusted such that the sheet electrode has an adequate porosity (Or a porosity of the positive electrode mix). The aluminum foil 50 (as the current collector) of the sheet electrode, with the mix thereon partly scraped off in the lateral direction, was ultrasonically welded to the lead plate 51 of the positive electrode.

In FIG. 8, there is shown a sheet electrode 5 as the negative electrode which was formed as follows. A mixture was prepared from a fine powder of pitch coke (LPC-A, from Sin-Nittetsu Kagaku), passing through a #391 mesh sieve (with an opening of 38 μm), and a 2 wt % aqueous solution of CMC (carboxymethylcellulose) (Celogen 4H, from Dai-ichi Seiyaku) as a binder, in a ratio of 98:2 by weight. This mixture was mixed with distilled water to give a paste. Thus there was obtained the negative electrode mix in slurry form. Incidentally, the amount of CMC is based on solids. The thus obtained slurry was applied to both sides of a rolled copper foil (14 μm thick). After drying and rolling, the coated copper foil was cut into a sheet electrode, 54 mm wide, which serves as the negative electrode. The sheet electrode (as the current collector), with the mix thereon partly scraped off in the lateral direction, was resistance-welded to the nickel lead plate 53 of the negative electrode.

These sheet electrodes, which serve as the positive and negative electrodes, were spirally wound, with the separator 6 (polypropylene nonwoven fabric) interposed between them. They were inserted into the negative electrode case 54 of stainless steel. The negative electrode lead plate 53 was resistance-welded to the center of the round bottom of the negative electrode case 54 which serves also as the terminal of the negative electrode. The wound sheet electrodes rest on the insulating bottom plate 55 of polypropylene, which has a hole as large as the void left after winding.

After assembling as mentioned above, the case was filled with an electrolyte composed of a 1:4 (by volume) mixed solvent of ethylene carbonate (EC) and methyl ethyl carbonate (MEC) and 2 mol/L of lithium perchlorate dissolved therein.

Subsequently, the lead plate 51 of the positive electrode was laser-welded to the aluminum seal plate 56. The battery lid consists of the nickel terminal 57 of the positive electrode and the sealing plate 56, which are fitted to the case, with the aluminum laminate foil 58 interposed between them. The aluminum laminate foil 58 functions as a safety valve to release gas when the internal pressure of the battery anomalously increases. Finally, the opening of the negative electrode case 54 was crimped to fix the lid, with the polypropylene insulating gasket 59 interposed between them. The completed battery has a size of 18650 type, which measures 18 mm in diameter and 65 mm long.

[The Making of Electric Double Layer Capacitor]

The battery of the present invention was examined for performance relative to the electrical double layer capacity which is said to be capable of charging and discharging infinite times because it is composed of polarizable electrodes between which no electric charges move through the electrolyte even then potential changes in either positive side or negative side. A sample of the electrical double layer capacitor (equivalent to a cell of 18650 size) was prepared in the same way as explained in the foregoing section "The making of battery". The structure of the electrical double layer capacitor is explained by reference to FIG. 8, because it is the same as that shown in FIG. 6. The positive electrode 4 shown in FIG. 8 was prepared as follows. A mixture was prepared from activated carbon (YP-17, from Kuraray Chemical), acetylene black (HS-100, from Denki Kagaku Kogyo), aqueous dispersion of PTF (polytetrafluoroethylene, 30J, from Mitsui-DuPont Fluorochemical), and 2 wt % aqueous solution of CMC (Celogen 4H, from Dai-ichi Seiyaku), in a ratio of 88:8:2:2 by weight. Incidentally, the amount of CMC is based on solids. This mixture was mixed with distilled water to give a paste. Thus there was obtained the positive electrode mix in slurry form. The slurry was applied to one side of an aluminum foil (20 μm thick). After drying and rolling, the coated aluminum foil was cut into a sheet electrode, 56 mm wide, which serves as the positive electrode.

The aluminum foil 50 (as the current collector) of the sheet electrode, with the mix thereon partly scraped off in the lateral direction, was ultrasonically welded to the aluminum lead plate 51 of the positive electrode.

The sheet electrode 5 (as the negative electrode) was prepared from the same slurry as used for the positive electrode mentioned above. The slurry was applied to both sides of a rolled copper foil 52 (14 μm thick). After drying and rolling, the coated foil was cut into a sheet electrode, 56 mm wide, which serves as the positive electrode. The sheet (as the current collector), with the mix thereon partly scraped off in the lateral direction, was resistance-welded to the nickel lead plate 53 of the negative electrode.

Incidentally, the electric double layer capacitor is provided with the positive and negative sheet electrodes of the same width, as mentioned above. In FIG. 8, the negative electrode is narrower than the positive electrode; however, this structure is applicable only to the battery.

The subsequent procedure is the same as that used for the battery production, and hence it is omitted. Incidentally, the electrolyte is composed of propylene carbonate and 1 mol/L of tetraethylammonium-tetrafluoroborate $((C_2H_5)_4NBF_4)$ dissolved therein.

[Charging-discharging Test on the Battery]

The battery thus obtained was tested for charging-discharging performance as follows in a thermostat at 25° C. The battery was charged at a constant current until the battery voltage reached 4.7 V. The charging current was set at 100 mA/g based on the weight of the negative electrode. After a 1-minute pause, the battery was discharged at the same current until the battery voltage decreased to 2.5 V. This charging-discharging cycle was repeated 10 times. These cycles are intended for activation and excluded from the total cycle numbers in the test. The next charging-discharging cycle is designated as the first cycle (or the initial cycle). In the first cycle, charging was carried out for 10 minutes at a constant current of 1 A and a constant voltage of 4.6 V and discharging was carried out at a current of 0.5 A until the cut-off voltage of 2.5 V was reached, with a 5-minute pause interposed between charging and discharging. This charging-discharging cycle was repeated 1000 times.

[Charging-discharging Test on the Electrical Double Layer Capacitor]

The electrical double layer capacitor thus obtained was tested for charging-discharging performance as follows in a thermostat at 25° C. The electrical double layer capacitor was charged at a constant current until the voltage across the terminals reached 2.3 V. The charging current was set at 0.1 mA/g based on the area of the positive electrode. After a 5-minute pause, the electrical double layer capacitor was discharged at the same current until the voltage across the terminals decreased to 0 V. This charging-discharging cycle was repeated 10 times. These cycles are intended for activation and excluded from the total cycle numbers in the test. The next charging-discharging cycle is designated as the first cycle (or the initial cycle). In the first cycle, charging was carried out for 10 minutes at a constant current of 1 A and a constant voltage of 2.3 V and discharging was carried out at a current of 0.5 A until the cut-off voltage of 0.575 V was reached, with a 5-minute pause interposed between charging and discharging. This charging-discharging cycle was repeated 1000 times.

<<Results and Summary of Examples>>

[Experiments with Test Cells Containing Graphitic Materials, Group A or Group B]

Table 2 shows the discharging capacity measured after the first cycle and the tenth cycle and the retention of the discharging capacity measured up to the tenth cycle. The retention of the discharging capacity is defined as the ratio (%) of the discharging capacity after the tenth cycle to the initial discharging capacity.

(a) Boron-free Graphitic Material

Figure 9:
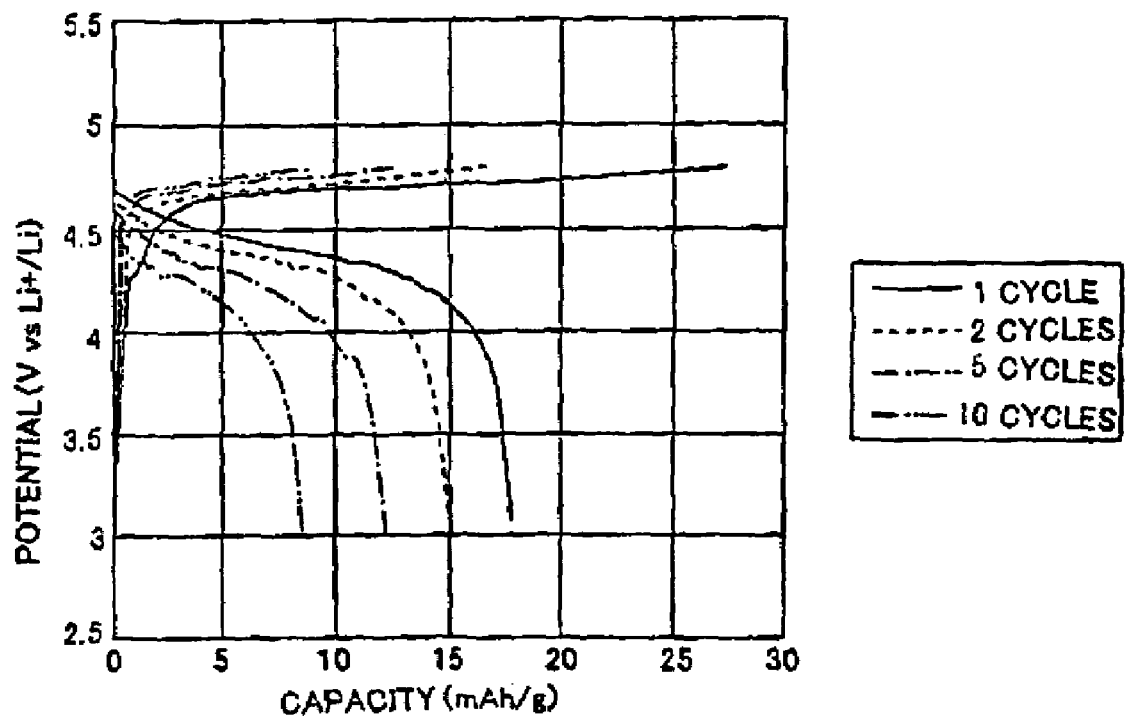
FIG. 9 is a diagram showing the charging-discharging curve of test cell No. 1.
Figure 10:
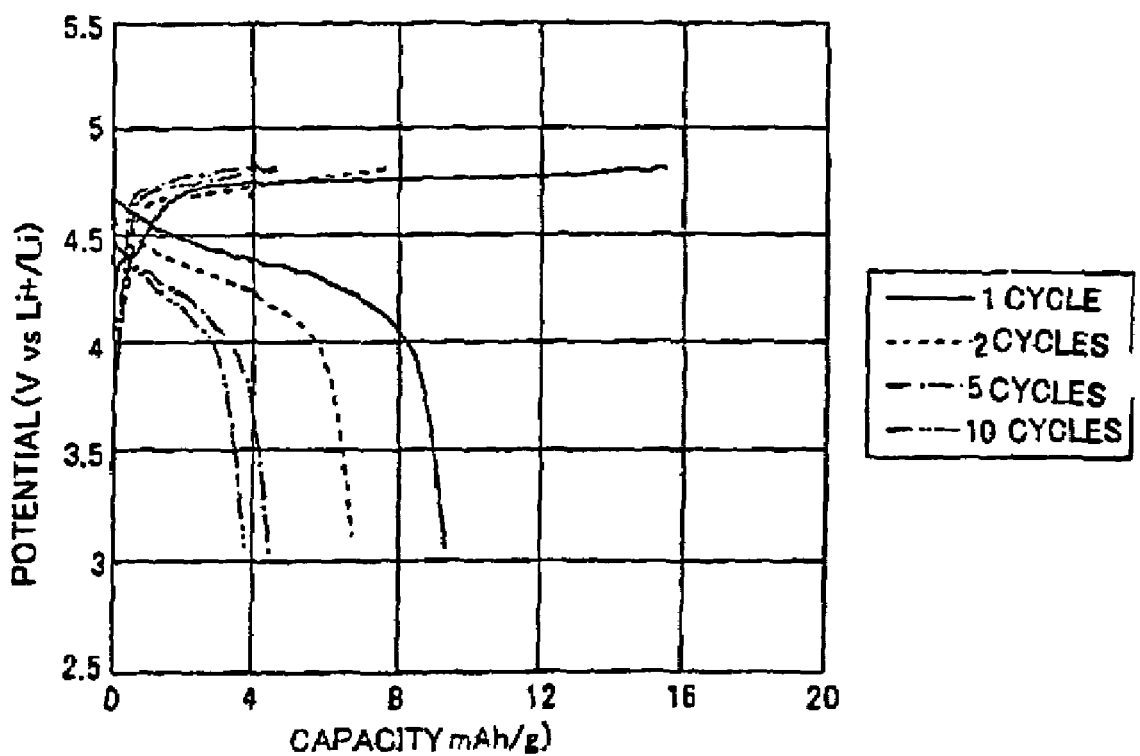
FIG. 10 is a diagram showing the charging-discharging curve of test cell No. 13.
Figure 11:
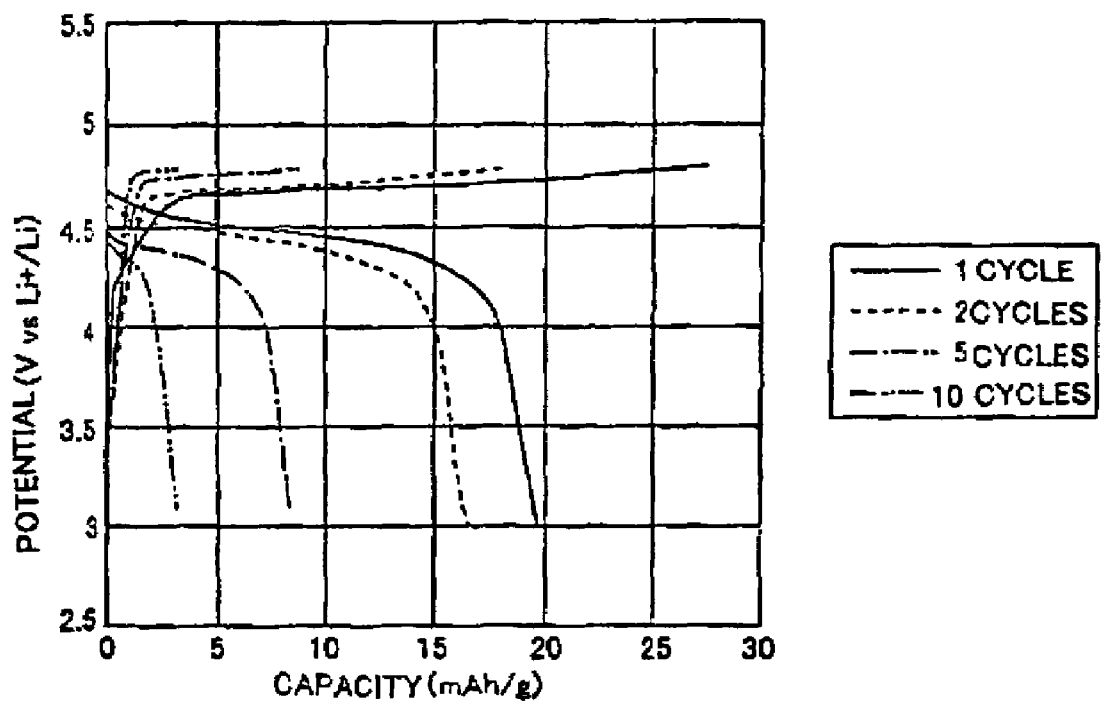
FIG. 11 is a diagram showing the charging-discharging curve of test cell No. 14.

Experiments with test cells Nos. 1, 12, 13, and 14 (containing an electrolyte of 2M $LiClO_4$/PC) were conducted to see how graphitic materials varying in the degree of crystallinity affect charging-discharging cycles. The test cells were charged at a charging voltage of 4.8 V. It was found that the initial discharging capacity increases with the increasing degree of graphitization or the decreasing value of d(002). FIGS. 9, 10, and 11 show the charging-discharging curves of test cells Nos. 1, 13, and 14. It is noted that each of these curves has a plateau in both the charging period and the discharging period. It is also noted that the charge starting voltage increases, the discharge starting voltage decreases, and the discharge capacity decreases as the charging-discharging cycles are repeated.

Figure 12:
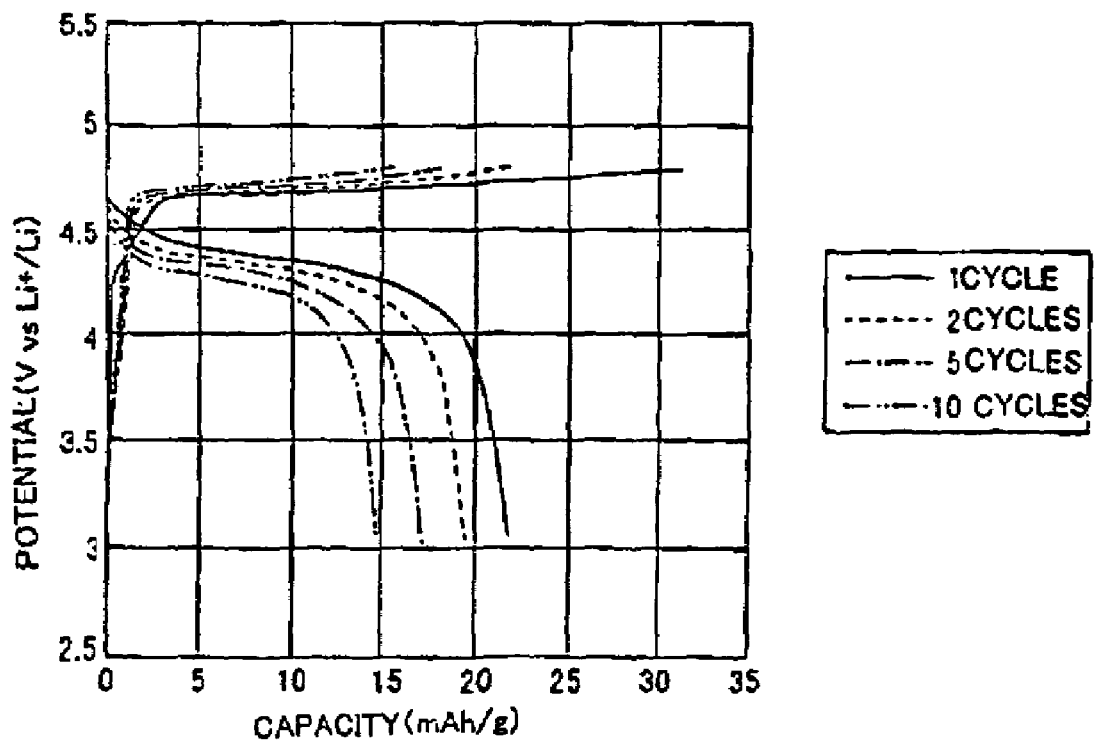
FIG. 12 is a diagram showing the charging-discharging curve of test cell No. 18.
Figure 13:
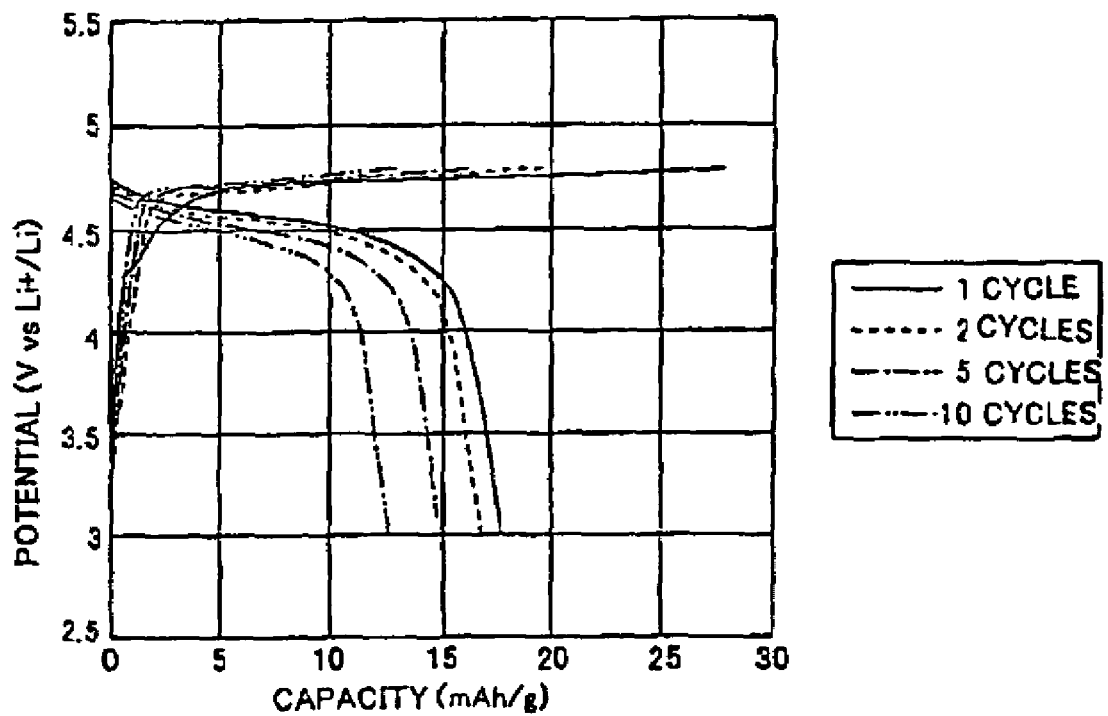
FIG. 13 is a diagram showing the charging-discharging curve of test cell No. 19.

Experiments with test cells Nos. 14, 18, and 19 (containing an electrolyte of 2M $LiPF_6$/PC or 2M $LiBF_4$/PC) were conducted to see how the electrolyte affects charging-discharging characteristic of graphitic material SFG-6. The test cells were charged at a charging voltage of 4.8 V. FIGS. 11, 12, and 13 show the charging-discharging curves of each test cell. It is noted that the curves change more slowly as the charging-discharging cycles are repeated in the case of 2M $LiPF_6$/PC or 2M $LiBF_4$/PC than in the case of 2M $LiClO_4$/PC. However, either electrolyte is not practicable in view of the fact that the discharging capacity decreases as the charging-discharging cycles are repeated.

Figure 14:
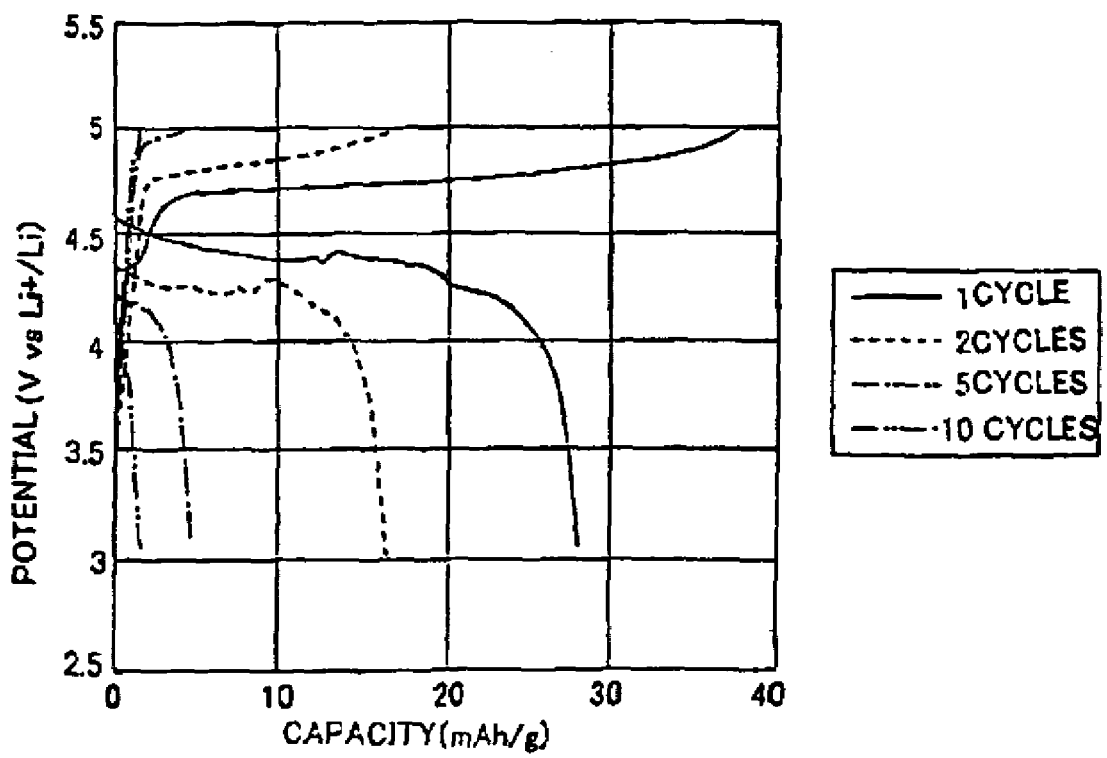
FIG. 14 is a diagram showing the charging-discharging curve of test cell No. 20.
Figure 15:
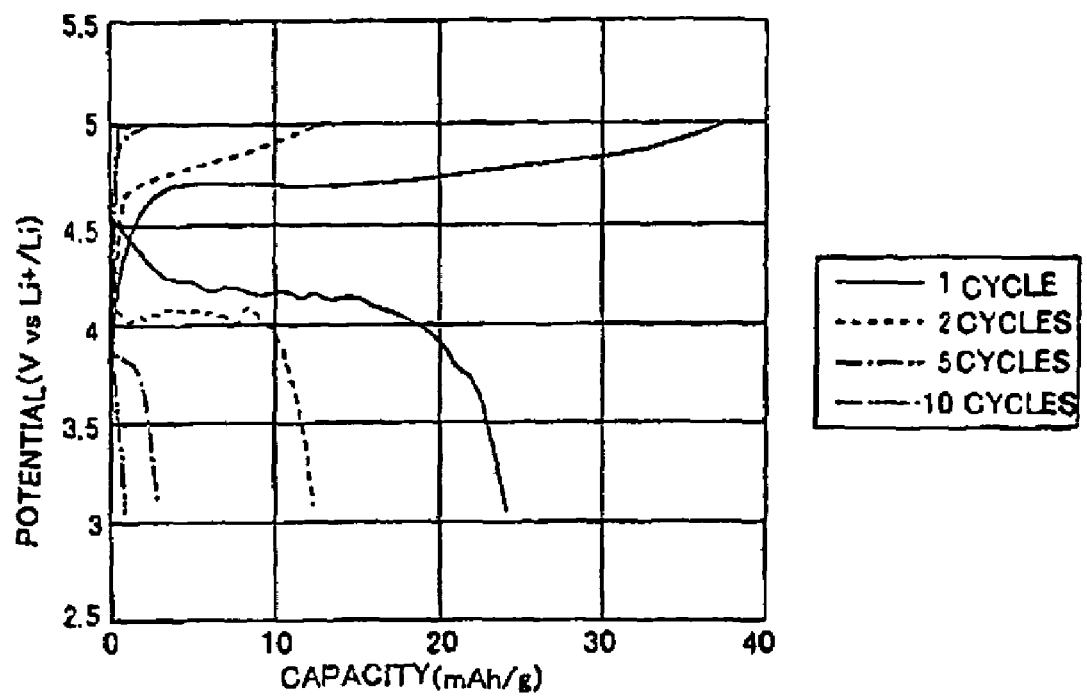
FIG. 15 is a diagram showing the charging-discharging curve of test cell No. 21.
Figure 16:
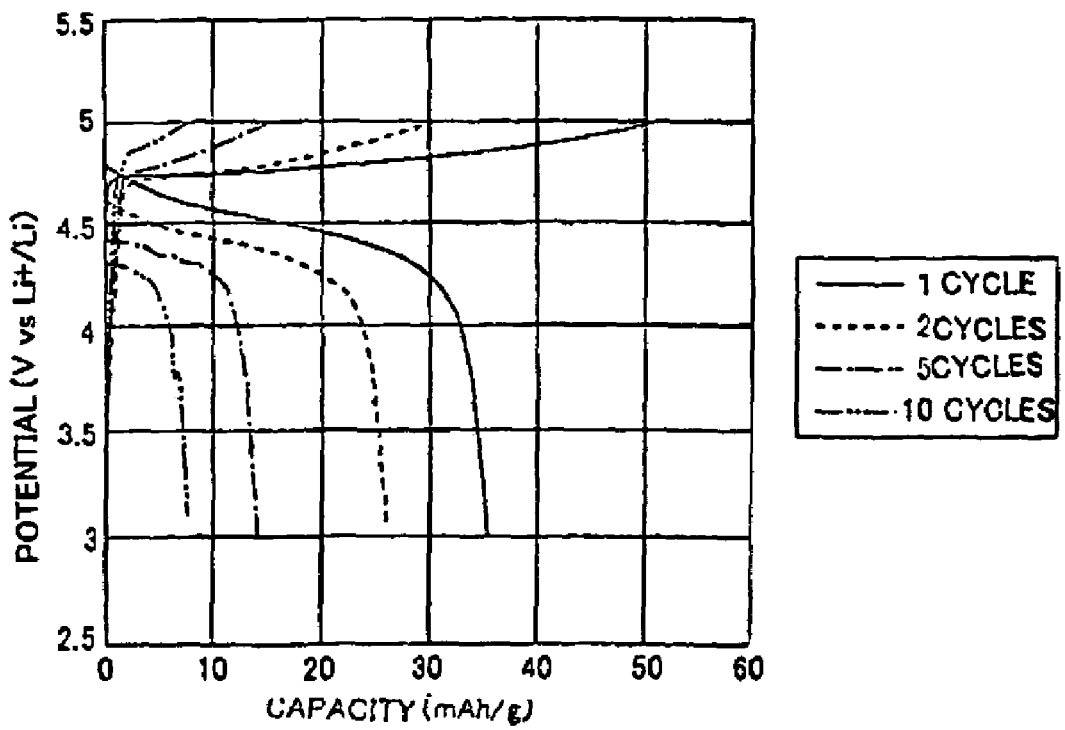
FIG. 16 is a diagram showing the charging-discharging curve of test cell No. 22.

Experiments with test cells Nos. 20, 21, and 22 (each containing a different electrolyte) were conducted to see how the electrolyte affects the cycle characteristic of graphitic material SFG-6. The test cells were charged at a charging voltage of 5.0 V. FIGS. 14, 15, and 16 show the charging-discharging curves of each test cell. It is noted that the initial capacity is larger than that which is attained when the charging voltage is 4.8 V, regardless of the kind of electrolyte. However, the retention of capacity after 10 cycles is larger in the case where the charging voltage is 4.8 V.

As mentioned above, the test cells (Nos. 1, 12-14, and 18-22) containing a graphitic material which had undergone final heat treatment without incorporation with boron greatly decreased in discharging capacity after only 10 cycles regardless of the kind of electrolyte. However, the highest retention of discharging capacity after 10 cycles was attained in the case of test cell (No. 19) in which the electrolyte is 2M LiBF$_4$/PC and the graphitic material is SFG-6. Nevertheless, the retention of discharging capacity was about 84% at the most. The cell as specified as mentioned above gave the largest discharging capacity in the first cycle when the charging voltage is 4.8 v; however, the value of capacity was about 23 mAh/g.

(b) Boron-containing Graphitic Material Pertaining to the Present Invention

Experiments were conducted to examine the effect of boron contained in the graphitic material by comparing the cycle characteristic of test cell No. 1 (which uses a boron-free graphitic material) with that of test cells Nos. 2 to 9 (which individually use a graphitic material containing boron in different amount). The graphitic materials used in these test cells originated from the same carbonaceous material before graphitization. The test cells used in the experiments contained an electrolyte of 2M LiClO$_4$/PC and their charging voltage was 4.9 V. The test cells with a boron-containing graphitic material gave a much higher retention of capacity than the test cell No. 1. The test cell No. 2, in which the boron content after graphitization is 0.02 wt %, achieved a better retention of capacity than the test cell No. 1. This demonstrates the effect of boron. However, the test cell No. 2 is inferior to the test cells Nos. 3 to 9 in the retention of capacity because of the excessively low boron content. The comparison between the test cell No. 2 and the test cell No. 3 suggests that the boron content after graphitization should preferably be higher than 0.05 wt %. The relation between the boron content after graphitization and the initial discharging capacity indicates that the discharging capacity tends to increase as the boron content increases. However, the discharging capacity begins to decrease when the boron content exceeds 4.74 wt %. A probable reason for this is that the boron compound added in an excess amount before graphitization remains in the form of boron carbide (B$_4$C), thereby reducing the ratio of graphitic material in which boron is dissolved, as mentioned above. For example, the test cell No. 9, in which the amount of residual boron is 12.6 wt %, is by far inferior in discharging capacity to other test cells Nos. 2 to 8. The foregoing results suggest that the amount of residual boron after graphitization should preferably be less than 11 wt %, as in the sample No. 8 (the test cell No. 8).

Experiments with the test cells Nos. 10 and 11 are intended to examine how the boron-containing graphitic material with a low degree of graphitization affects the charging-discharging performance when the temperature for heat treatment of boron compounds is decreased. The sample No. 11, in which a boron-containing graphitic material was heat-treated at as low a temperature as 1200° C., is superior in crystallinity, with d(002) being 3.365 Å, to the sample No. 1, in which a boron-free graphitic material was heat-treated at 2900° C. Moreover, the sample No. 11 did not decrease in discharging capacity (no degradation in cycle characteristics) after repeated charging-discharging cycles. On the other hand, the sample No. 10, which had undergone heat treatment at 1200° C., apparently has a higher degree of crystallinity, in terms of d(002), than the sample 1. However, the discharging capacity after 10 cycles was smaller than the initial capacity despite the fact that the boron content is higher than 0.05 wt %. The cause for this is an excessively low heat-treatment temperature which prevents the sufficient crystal growth. This is apparent from the fact that the sample No. 10 has a d(200) value of 3.371 Å, whereas the sample No. 11 has a d(200) value of 3.365 Å. The foregoing suggests that the boron-containing graphitic material should preferably have a d(200) value of 3.365 Å.

Experiments with the test cells Nos. 14 and 15 were conducted to examine how they change in the charging-discharging characteristic if the graphic material SFG-6, which originally has a high crystallinity, is incorporated with boron and heat-treated. As the result of such additional procedure, SFG-6 decreased in d(002) value and increased in R value (which is calculated by Raman spectrometry). Presumably, heat treatment at 2900° C. causes the added boron to dissolve in SFG-6.

The sample No. 15 (which is a boron-containing graphitic material) gives a higher initial discharging capacity and a higher retention of capacity after 10 cycles than the graphitic material SFG-6 as a starting material. This suggests that the graphitic material greatly improves in cycle characteristic if it is incorporated with boron.

The foregoing revealed that the boron-containing graphitic material is by far superior in cycle characteristics (with a large discharging capacity) to the boron-free graphitic material. The difference between them is apparent from the R value calculated from measurements of Raman spectrum, although it is impossible to clarify the state in which boron exists. The boron-containing graphitic material has a larger R value of Raman spectrum than the boron-free graphitic material even though they are identical in d(002) value. Ordinary graphite, in which the d(002) value is 3.365 Å, does not have such a high R value. The graphitic material will produce the full effect of the present invention so long as it has an R value higher than 0.35 as the sample No. 2 has.

Figure 17:
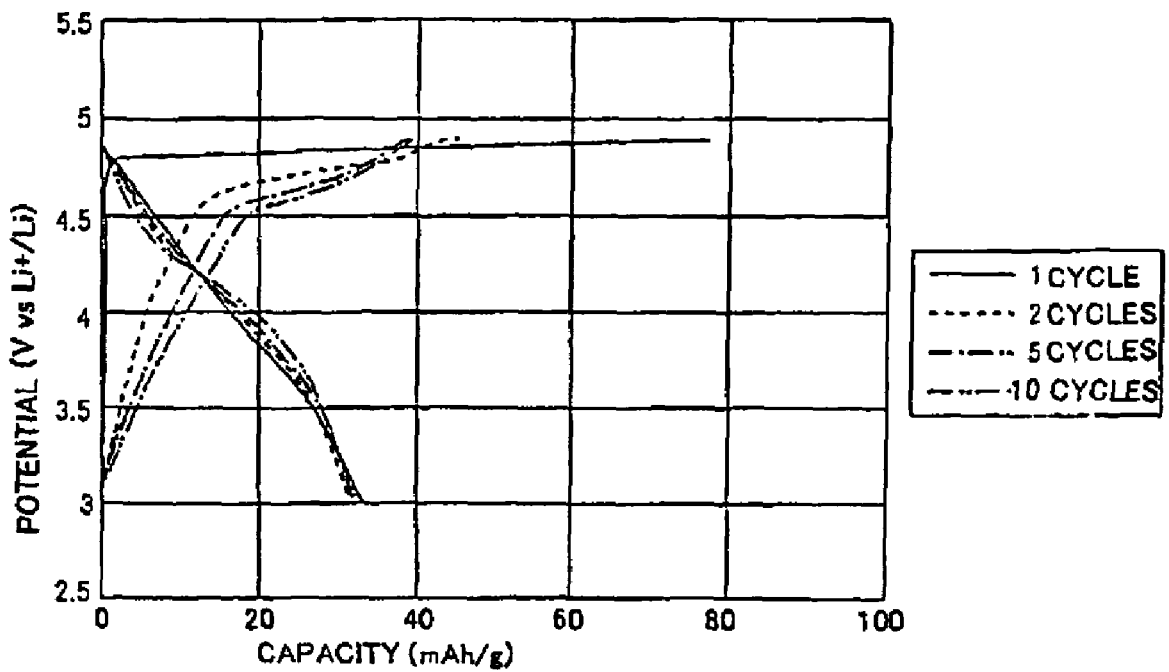
FIG. 17 is a diagram showing the charging-discharging curve of test cell No. 5.

The sample No. 5 (the test cell No. 5) containing an electrolyte of 2M LiClO$_4$/PC was tested by charging at a charging voltage of 4.9 V to examine the boron-containing graphitic material for charging-discharging characteristic. The typical charging-discharging curves are shown in FIG. 17. The boron-containing graphitic material gives the charging curve for the first cycle which is similar to that of the ordinary boron-free graphitic material (as shown in FIGS. 9 to 16). However, the discharging curve which is obtained subsequently has no apparent plateau but exhibits hysteresis. The discharging curves obtained after the second and subsequent cycles do not have any plateau, with the potential monotonously decreasing with the increasing capacity. As mentioned above, the boron-containing graphitic material gives charging-discharging curves different from those of the boron-free graphitic material. This suggests the possibility that the charging-discharging reaction takes place differently in the boron-containing graphitic material than in the conventional graphitic material.

Figure 18:
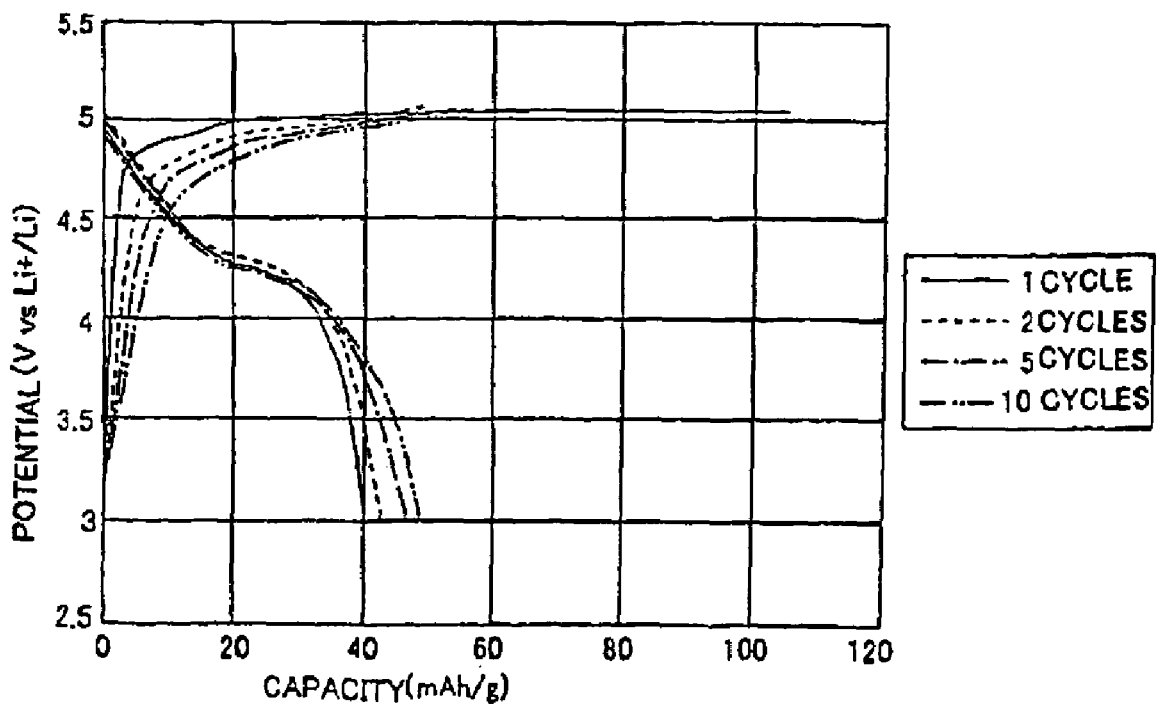
FIG. 18 is a diagram showing the charging-discharging curve of test cell No. 16.
Figure 19:
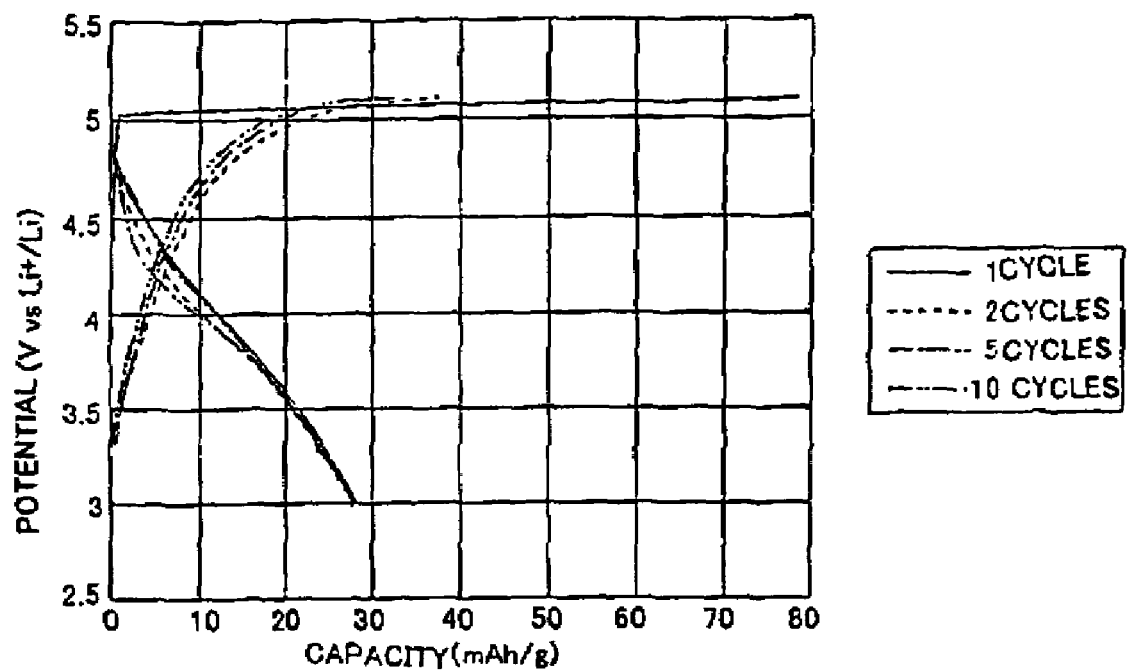
FIG. 19 is a diagram showing the charging-discharging curve of test cell No. 17.
Figure 20:
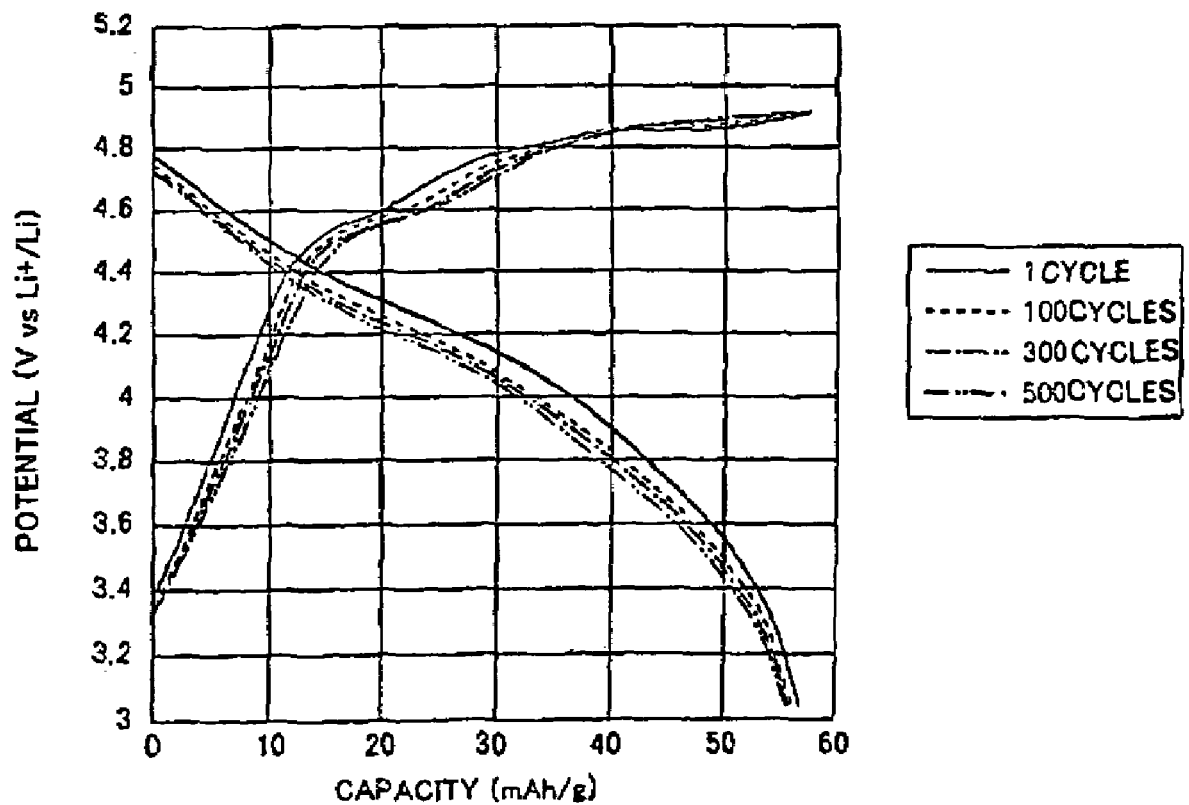
FIG. 20 is a diagram showing the charging-discharging curve of test cell No. 30.
Figure 21:
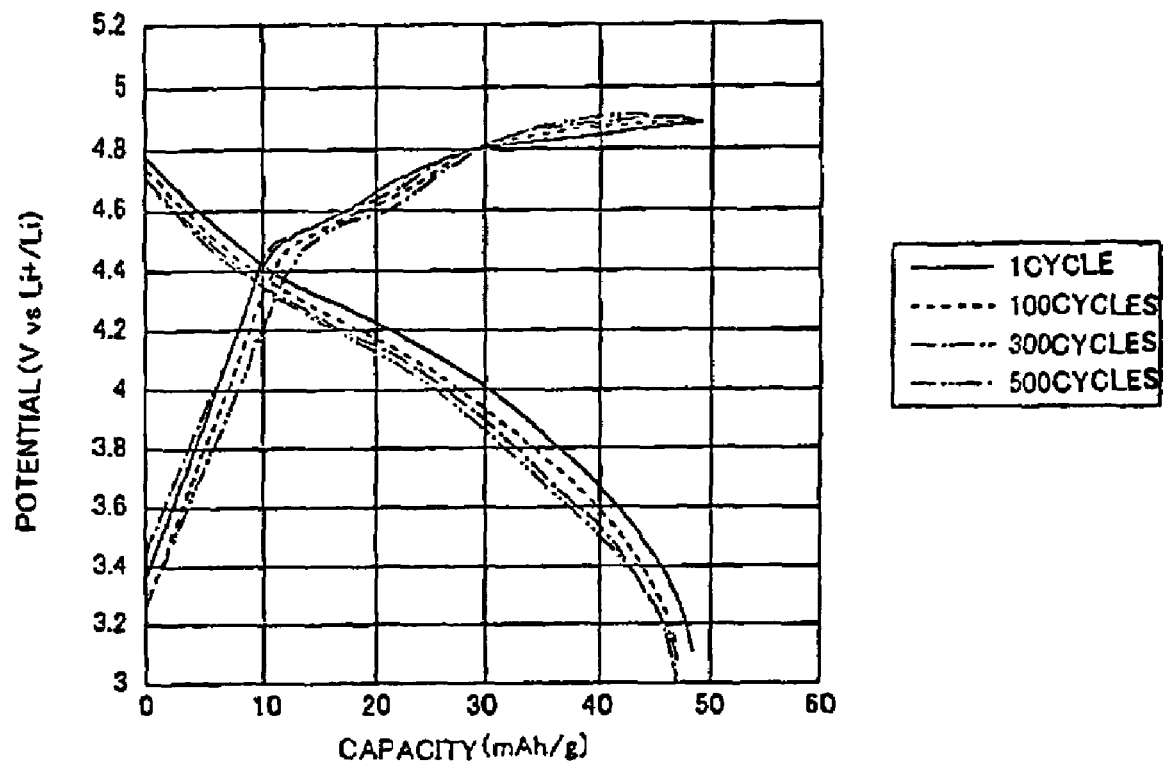
FIG. 21 is a diagram showing the charging-discharging curve of test cell No. 29.
Figure 22:
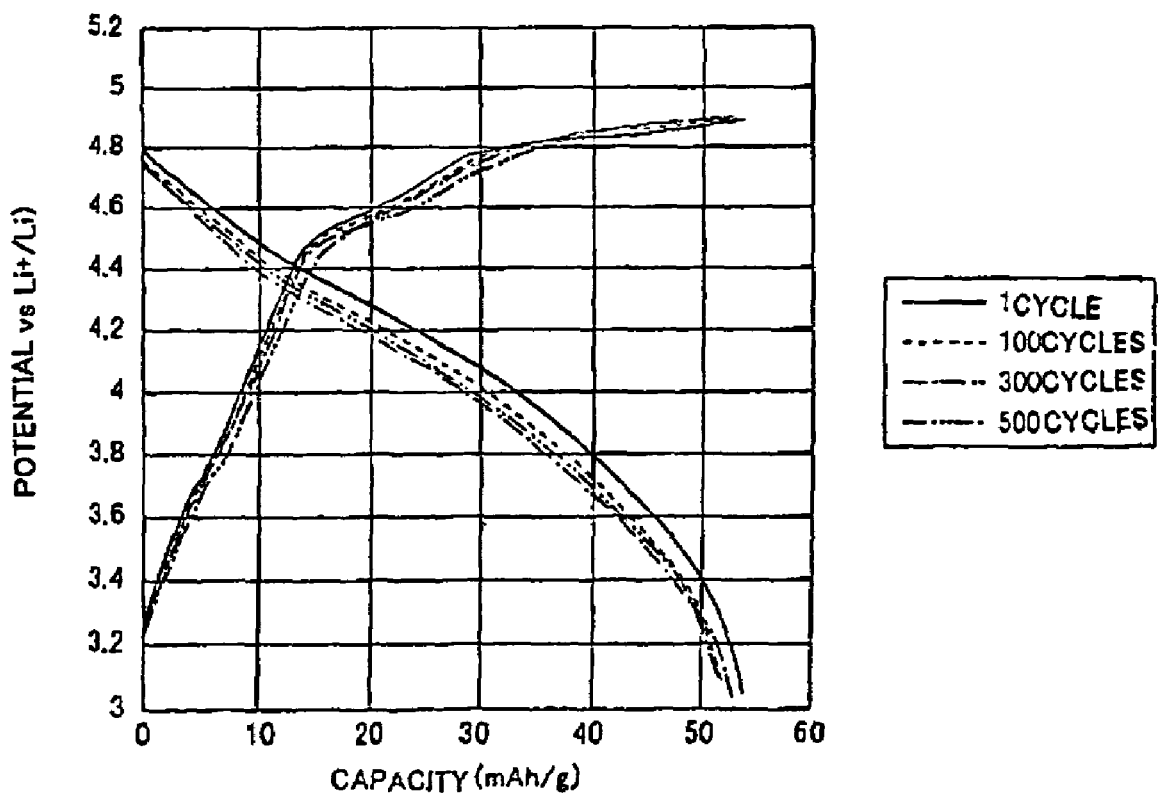
FIG. 22 is a diagram showing the charging-discharging curve of test cell No. 40.
Figure 23:
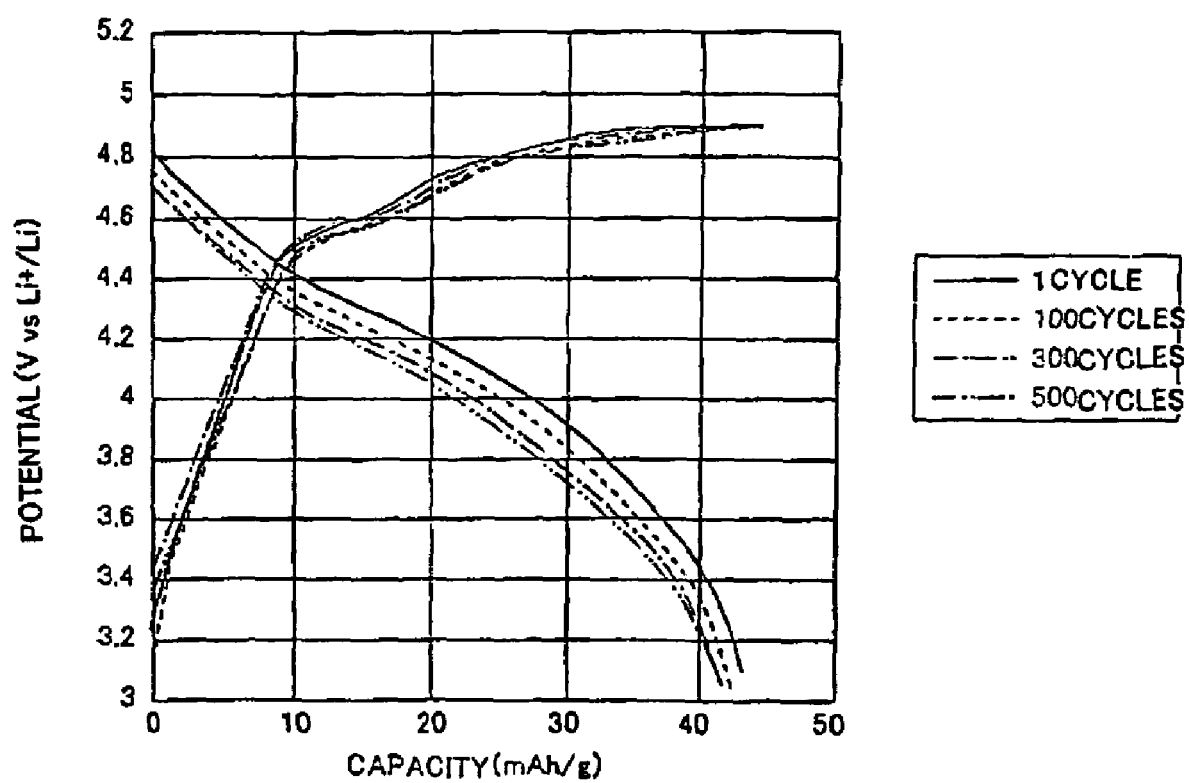
FIG. 23 is a diagram showing the charging-discharging curve of test cell No. 27.

This phenomenon is observed also in the case where a different electrolyte is used. The test cells Nos. 16 and 15, which are identical with the test cell No. 5 except that the electrolyte is replaced by 2M LiPF$_5$/PC or 2M LiBF$_4$/PC, were examined for charging-discharging characteristics. Their charging-discharging curves are shown in FIGS. 18 and 19. Both of the electrolytes give the initial charging-discharging curve which has the same hysteresis as mentioned above and also give the subsequent discharging curve which has no apparent plateau. Also, the test cells Nos. 16 and 17, which were charged at a charging voltage higher than 5.0 V, did not experience the significant degradation in cycle characteristics which the test cells Nos. 20 to 22 containing an ordinary graphitic material experienced.

Incidentally, the experiment in this example was designed to examine how the graphitic material (sample No. 5) performs in the electrolyte of 2M $LiPF_6$/PC or 2M $LiBF_4$/PC. Other experiments on the boron-containing graphitic materials (samples Nos. 2-4, 6-11, and 15) in either of the electrolytes mentioned above gave the same results. Therefore, the data of individual experiments are omitted.

The results of experiments on the test cells revealed that the graphitic material which is obtained by heat treatment from a carbonaceous material containing boron or a boron compound and which has an interplaner spacing d(002) smaller than 3.365 Å (between the (002) planes) and an R value larger than 0.35 has a larger discharging capacity and shows a much smaller decrease in discharging capacity even after repeated charging-discharging cycles as compared with the ordinary graphitic material having the same value of d(200). All the graphitic materials obtained as mentioned above are not identical; the one containing 0.05-11 wt % of boron retains the capacity more than 100% while keeping a large discharging capacity. It did not decrease in discharging capacity after repeated charging-discharging cycles within the range specified in the test.

[Experiments with Test Cells Containing Graphitic Materials, Group C, D, or E]

Table 3 shows the discharging capacity after the first cycle and the 500th cycle and the retention of capacity (the ratio of the discharging capacity after the 500th cycle to the discharging capacity after the first cycle). These data were obtained from experiments with the test cells each containing any of the graphitic materials, group C, D, or E.

Experiments on the graphitic materials, group C, were conducted to examine how the discharging capacity and cycle characteristic are affected by the content of boron and silicon remaining in the graphitic material. The results of experiments on the graphitic materials (samples Nos. 23-26, 27-30, 31-34, and 35-38) containing the same amount of residual boron after graphitization revealed that the graphitic materials containing both silicon and boron have a larger discharging capacity and a higher retention of capacity up to the 500th cycle as compared with the graphitic materials containing boron only. Thus, Table 3 suggests that the graphitic materials containing 0.05-11 wt % of boron will have a high discharging capacity and an improved cycle characteristic if it contains 0.01-5 wt % of silicon in addition to boron. The graphitic material varies in physical properties when it contains silicon in addition to boron; that is, the graphitic material containing both boron and silicon has a larger d(002) value and a larger R value than the graphitic material containing boron only. Presumably, this is because the strain of graphite crystals becomes large as the result of introduction of silicon. A relationship was found between the silicon content and the improvement in discharging capacity and cycle characteristic.

However, there is an instance where a sample containing boron only (such as sample No. 31) is superior in discharging capacity and capacity retention to a sample containing both silicon and boron (such as sample No. 24). This suggests that it is necessary to consider the boron content so that silicon produces its effect.

Samples Nos. 39 and 40 in Table 3 are identical with samples Nos. 23 to 38 in the raw carbonaceous material (graphitic material, group C) and the boron compound ($B_2O_3$) and silicon compound ($SiO_2$) incorporated therein but differs from it in the manufacturing process, in which mixing is followed by forming and heat treatment (for graphitization) is followed by regrinding. Sample No. 39 contains nearly as much boron and silicon as sample No. 29. However, the former is superior to the latter in discharging capacity and capacity retention after 500 cycles. Similarly, sample No. 40 contains nearly as much boron as sample No. 27. However, the former is superior to the latter in discharging capacity and capacity retention after 500 cycles. FIGS. 20 to 23 show the charging-discharging curve (up to 500 cycles) of samples Nos. 39, 29, 27, and 40. These curves do not have any difference resulting from difference in the manufacturing process. Presumably, this is because boron atoms and silicon atoms contained in the graphitic material are uniformly dispersed.

[Experiments with Test Cells Containing Graphitic Materials, Group F]

Table 4 shows the particle size distribution and load characteristic of the graphitic materials, group E (samples Nos. F-1 to F-12). These samples have almost the same capacity if charging is carried out with a current density of 1 $mA/cm^2$. However, they differ in discharging capacity depending on particle size. In the case of samples (Nos. F-4, 6, 8, 10, and 11), each of which is composed of particles having an average particle diameter of 10-60 μm and having a particle size distribution such that particles having a particle diameter smaller than 5 μm account for less than 10%, the retention of capacity in the case of charging with a current density of 100 $mA/cm^2$ is higher than 40%. (The retention of capacity is the ratio of the discharging capacity in the case of charging with a current density of 100 $mA/cm^2$ to the discharging capacity in the case of charging with a current density of 10 $mA/cm^2$.) In the case of charging with a current density higher than 60 $mA/cm^2$, the capacity and the retention of capacity tend to decrease it the sample is composed of fine powder (having an average particle diameter smaller than 10 μm) or coarse powder (having an average particle diameter larger than 60 μm) or the powder has a particle size distribution such that particles smaller than 5 μm account for more than 10%.

Figure 24:
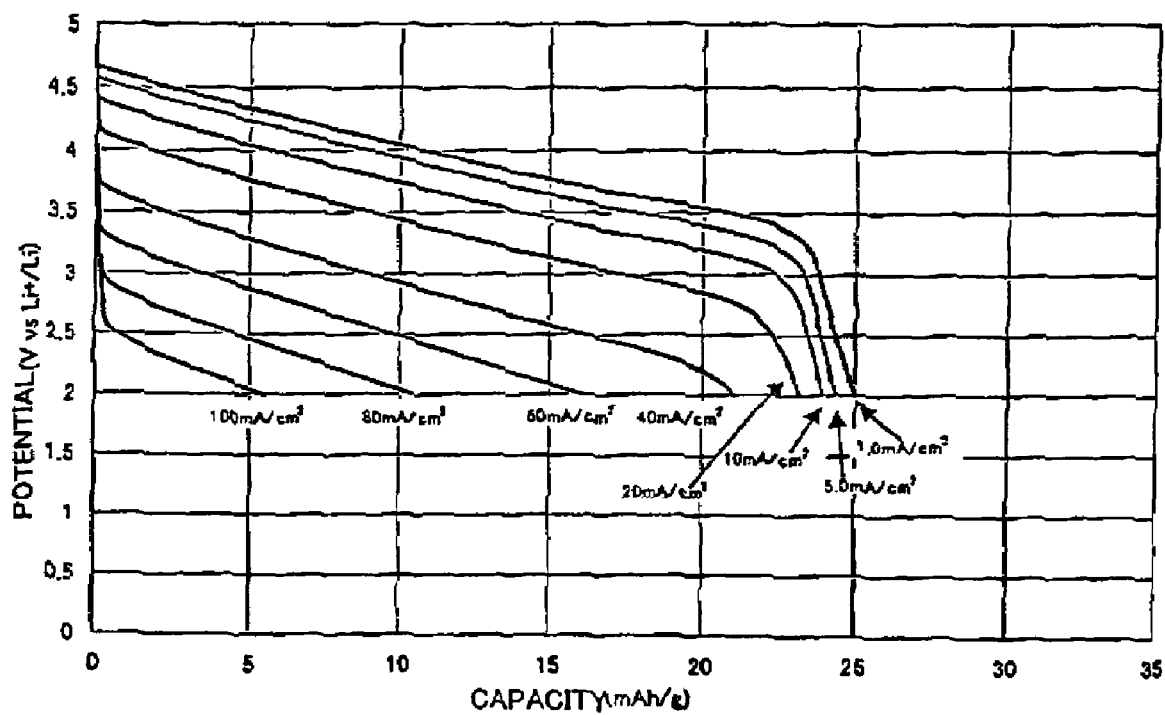
FIG. 24 is a diagram showing the charging-discharging curve of test cell F-2.
Figure 25:
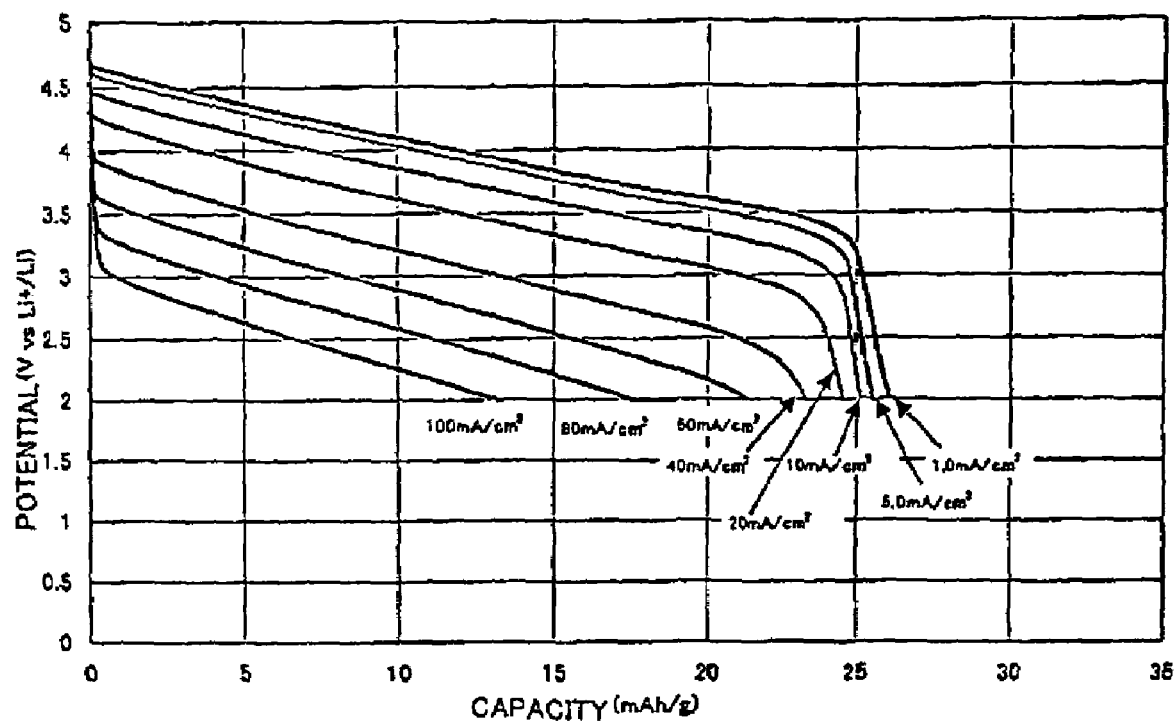
FIG. 25 is a diagram showing the charging-discharging curve of test cell F-6.
Figure 26:
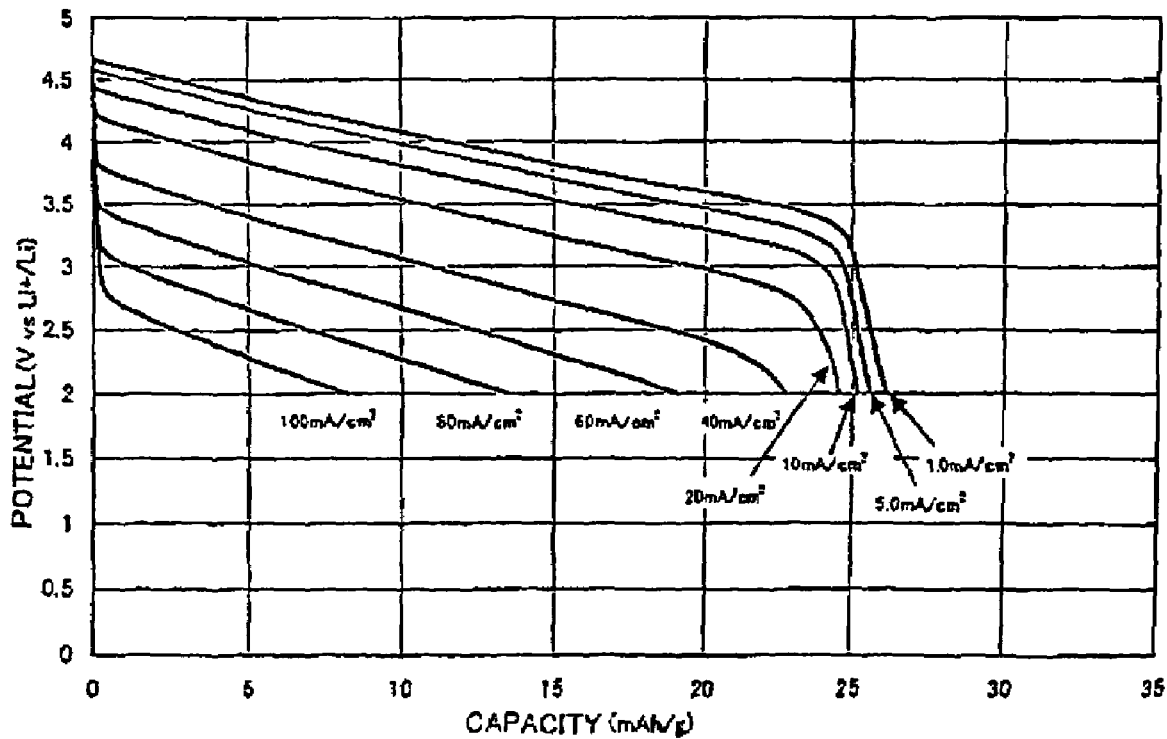
FIG. 26 is a diagram showing the charging-discharging curve of test cell F-12.
Figure 27:
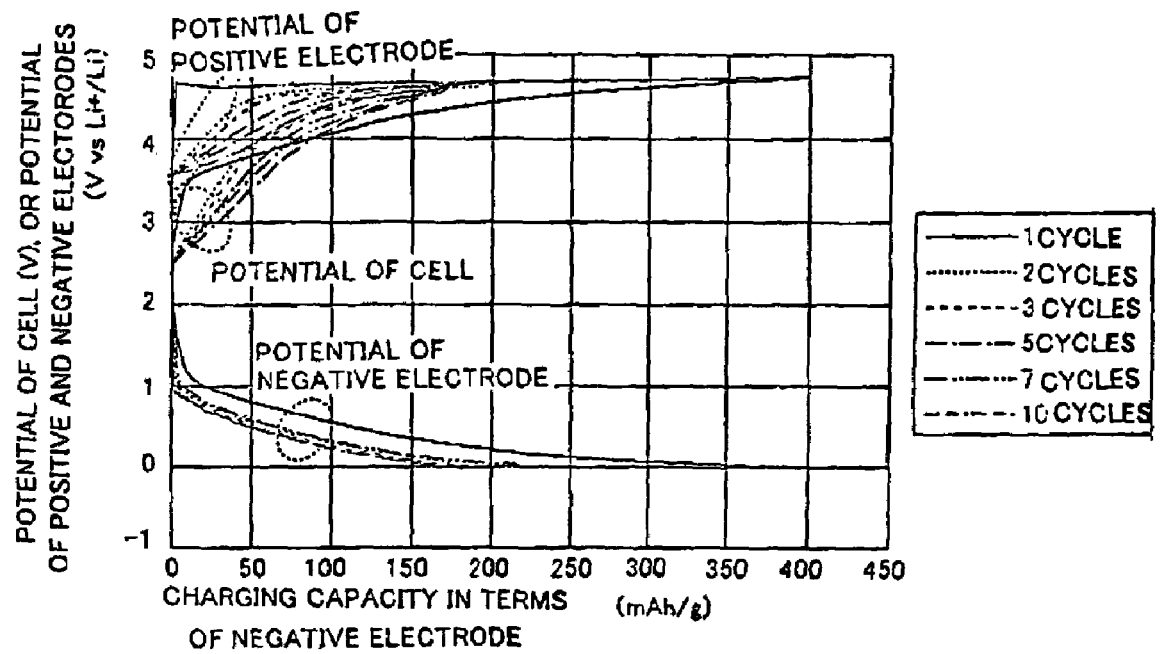
FIG. 27 is a diagram showing the charging-discharging curve of the battery of test cell type (positive electrode 15 mm$\phi$, negative electrode 13 mm$\phi$)
Figure 28:
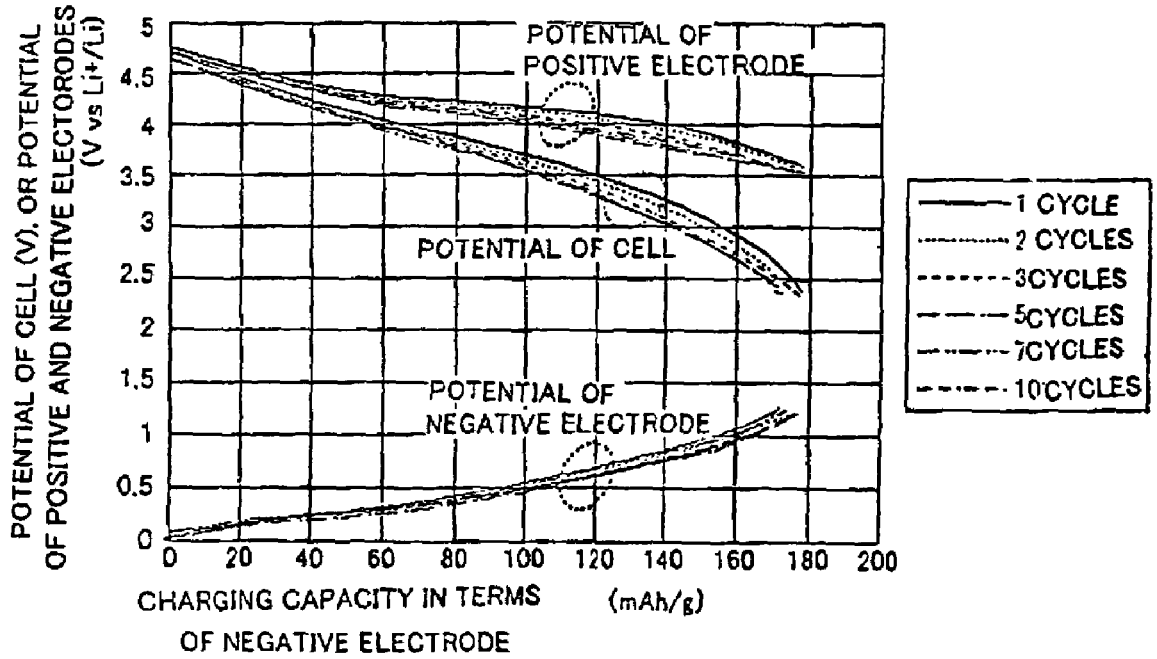
FIG. 28 is a diagram showing the charging-discharging curve of the battery of test cell type (positive electrode 15 mm$\phi$, negative electrode 13 mm$\phi$)
Figure 29:
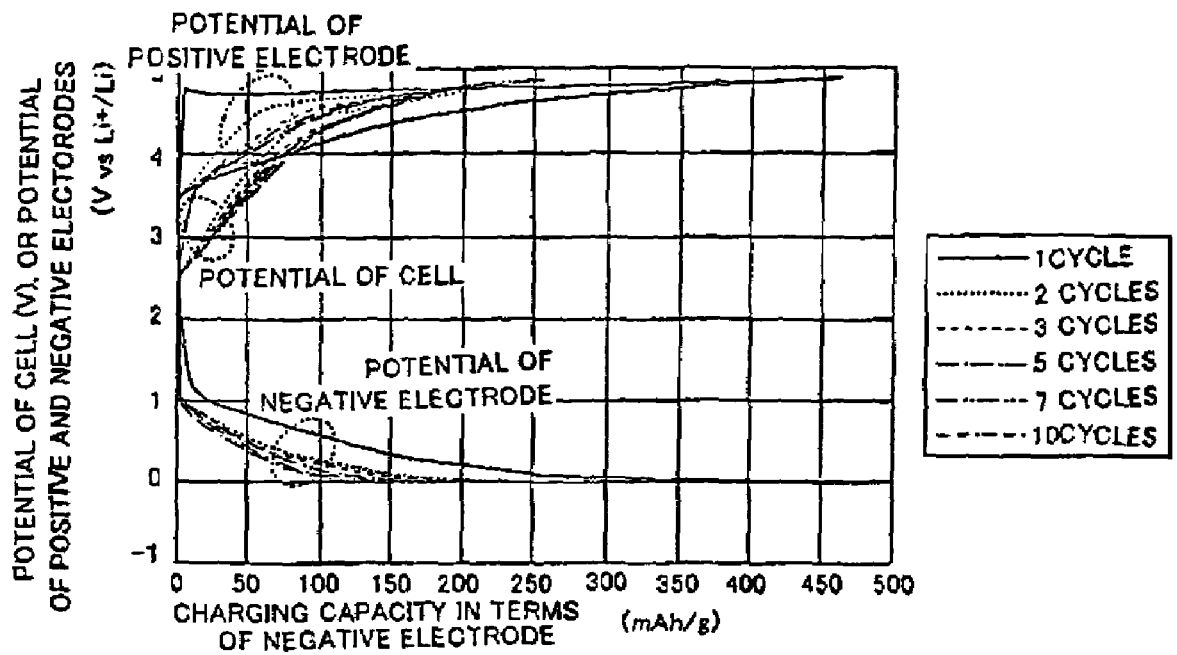
FIG. 29 is a diagram showing the charging-discharging curve of the battery of test cell type (positive electrode 13 mm$\phi$, negative electrode 13 mm$\phi$)
Figure 30:
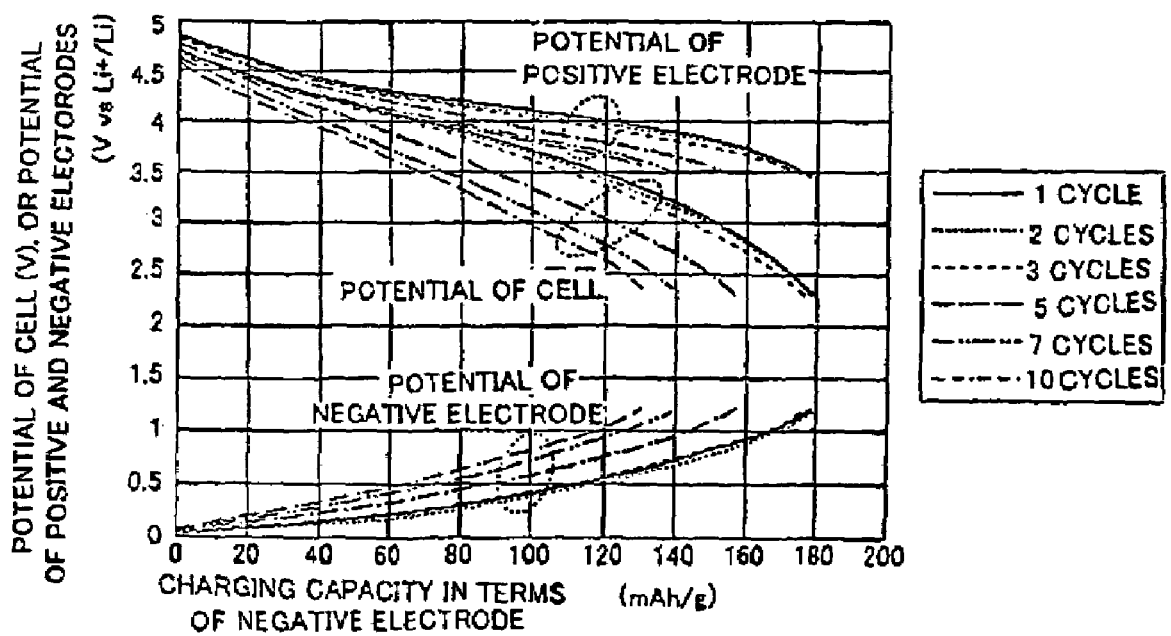
FIG. 30 is a diagram showing the charging-discharging curve of the battery of test cell type (positive electrode 13 mm$\phi$, negative electrode 13 mm$\phi$)
Figure 31:
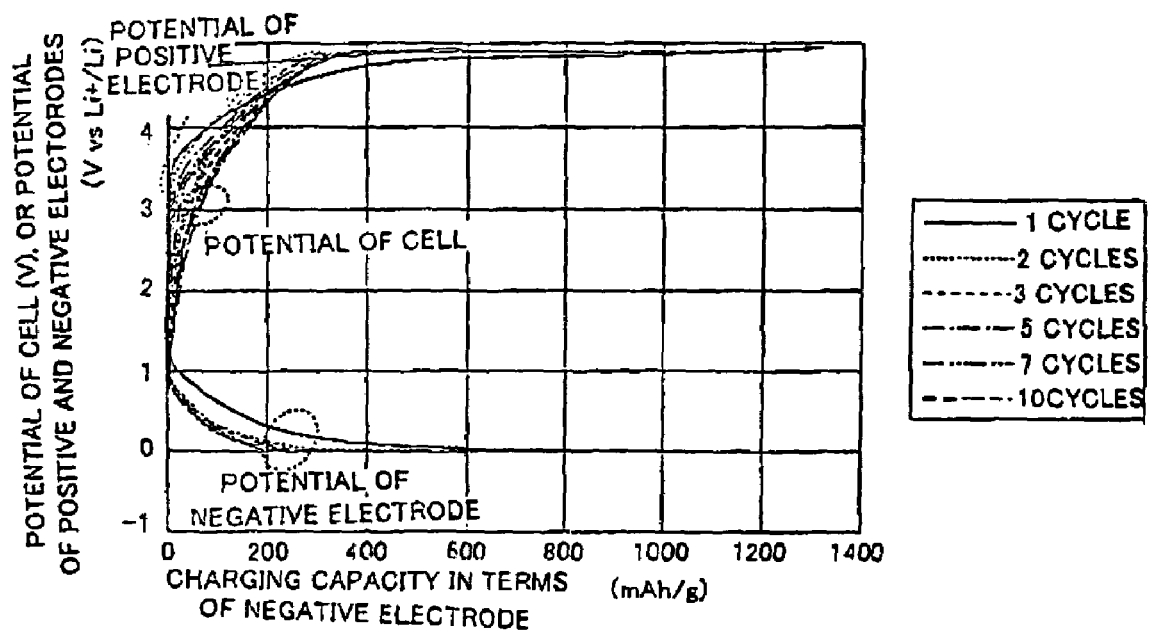
FIG. 31 is a diagram showing the charging-discharging curve of the battery of test cell type (positive electrode 13 mm$\phi$, negative electrode 15 mm$\phi$)
Figure 32:
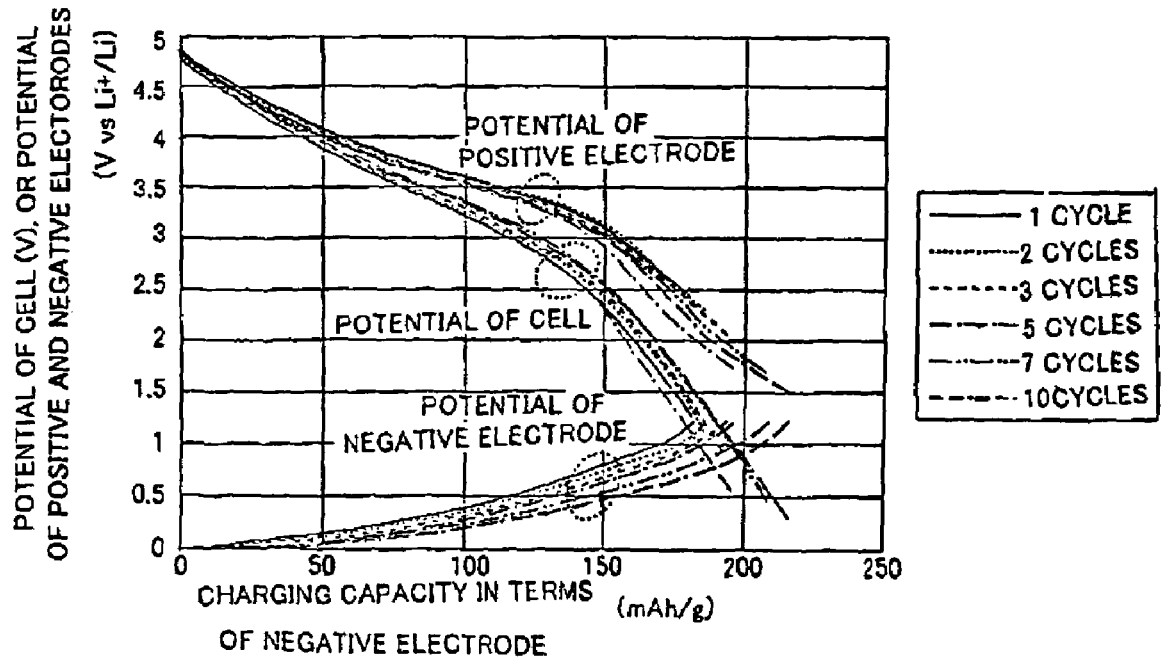
FIG. 32 is a diagram showing the charging-discharging curve of the battery of test cell type (positive electrode 13 mm$\phi$, negative electrode 15 mm$\phi$)

FIGS. 24 to 26 show the discharging curve of samples Nos. F-2, F-6, and F-12. It is noted that samples Nos. F-2 and F-12, which have a low retention of capacity, show a significant voltage drop immediately after the start of discharging, particularly in the region of 60 $mA/cm^2$ and above. This indicates that the magnitude of polarization depends on the particle size distribution.

[Charging-discharging Test with Battery of Test Cell Type]

Table 5 shows the charging-discharging capacity, the charging-discharging efficiency, and the retention of discharging capacity which were observed after each cycle. (The retention of discharging capacity is the ratio of the discharging capacity in each cycle to the discharging capacity in the first cycle.) FIGS. 27 to 32 show the charging-discharging curve of each cell.

TABLE 5

Charging-discharging capacity of test cells varying in arrangement of positive and negative electrodes

| Specification of battery | Item tested | Number of charging-discharging cycles | | | | | |
|---|---|---|---|---|---|---|---|
| | | 1 | 2 | 3 | 5 | 7 | 10 |
| Positive electrode: 15 mmφ | Charging capacity (mAh/g) | 399.9 | 212.8 | 190.7 | 182.9 | 182.4 | 184.0 |
| | Discharging capacity (mAh/g) | 177.4 | 174.7 | 170.2 | 170.2 | 171.9 | 176.3 |
| Negative electrode: 13 mmφ | Charging-discharging efficiency (%) | 44.4 | 82.1 | 89.3 | 93.1 | 94.2 | 95.8 |
| | Retention of capacity (%) | 100.0 | 98.4 | 96.0 | 96.0 | 96.9 | 99.4 |
| Positive electrode: 13 mmφ | Charging capacity (mAh/g) | 460.2 | 253.2 | 219.5 | 173.6 | 149.8 | 137.1 |
| | Discharging capacity (mAh/g) | 177.8 | 178.9 | 176.1 | 155.6 | 138.9 | 129.4 |
| Negative electrode: 13 mmφ | Charging-discharging efficiency (%) | 38.6 | 70.7 | 80.2 | 89.6 | 92.7 | 94.4 |
| | Retention of capacity (%) | 100.0 | 100.6 | 99.1 | 87.5 | 78.1 | 72.8 |
| Positive electrode: 13 mmφ | Charging capacity (mAh/g) | 1302.2 | 578.6 | 382.3 | 274.4 | 284.7 | 265.6 |
| | Discharging capacity (mAh/g) | 181.5 | 186.5 | 193.6 | 196.1 | 208.9 | 216.5 |
| Negative electrode: 15 mmφ | Charging-discharging efficiency (%) | 13.9 | 32.2 | 50.7 | 71.5 | 73.4 | 81.5 |
| | Retention of capacity (%) | 100.0 | 102.8 | 106.7 | 108.0 | 115.1 | 119.3 |

Of these three cells tested, the one having a positive electrode, 15 mm in diameter, and a negative electrode, 13 mm in diameter, attained the highest charging-discharging efficiency in the first cycle. In this cell, the positive and negative electrodes are arranged such that the periphery of the plane of the negative electrode facing to the positive electrode, said plane being projected to the plane of the positive electrode facing to the negative electrode, is surrounded by the periphery of the plane of the positive electrode facing to the negative electrode.

Of these three cells, the one having a positive electrode, 13 mm in diameter, and a negative electrode, 13 mm in diameter, showed a lower charging-discharging efficiency in the first cycle and degraded more rapidly in charging-discharging efficiency as cycles proceeded, than the one having a positive electrode, 15 mm in diameter, and a negative electrode, 13-mm in diameter. In this cell, the positive and negative electrodes are arranged such that the periphery of the plane of the negative electrode facing to the positive electrode, said plane being projected to the plane of the positive electrode facing to the negative electrode, coincides with the periphery of the plane of the positive electrode facing to the negative electrode.

Of these three cells tested, the one having a positive electrode, 13 mm in diameter, and a negative electrode, 15 mm in diameter, attained the largest irreversible capacity in the first cycle and showed the lowest charging-discharging efficiency in each cycle. In this cell, the positive and negative electrodes are arranged such that the periphery of the plane of the positive electrode facing to the negative electrode, said plane being projected to the plane of the negative electrode facing to the positive electrode, is surrounded by the periphery of the plane of the negative electrode facing to the positive electrode. This did not decrease in capacity as charging-discharging cycles proceeded but had an excessively large irreversible capacity that occurred in the first cycle. This is not desirable because much of the solute dissolved in the electrolyte is irreversibly consumed.

The foregoing results indicate that a good battery characteristic is obtained only if the positive and negative electrodes are arranged such the periphery of the plane of the negative electrode facing to the positive electrode, said plane being projected to the plane of the positive electrode facing to the negative electrode, is surrounded (or covered) by the periphery of the plane of the positive electrode facing to the negative electrode.

[Test on Battery and Electrical Double Layer Capacitor for Charging-discharging Characteristics]

A battery was prepared according to the procedure explained in the foregoing section "The making of battery". In this battery the positive electrode sheet has a positive electrode mix containing the above-mentioned graphitic material, group D, with the porosity therein varied. Table 6 below shows the porosity of the positive electrode mix, the initial discharging capacity, the discharging capacity after 1000 cycles, and the retention of capacity after 1000 cycles.

TABLE 6

Porosity of positive electrode mix, discharging capacity, and retention of capacity

| Porosity | Initial capacity (mAh/g) | Capacity after 1000 cycles (mAh/g) | Retention of capacity after 1000 cycles (%) |
|---|---|---|---|
| 0.11 | 90.1 | 48.0 | 53.3 |
| 0.15 | 89.0 | 55.0 | 61.8 |
| 0.20 | 87.9 | 61.3 | 69.7 |
| 0.24 | 86.6 | 66.8 | 77.1 |
| 0.29 | 85.2 | 71.8 | 84.3 |
| 0.34 | 83.7 | 75.7 | 90.4 |
| 0.38 | 82.0 | 78.4 | 95.6 |
| 0.43 | 80.2 | 78.7 | 98.1 |
| 0.48 | 78.1 | 77.8 | 99.6 |
| 0.52 | 75.8 | 75.6 | 99.7 |
| 0.57 | 73.2 | 73.2 | 100.0 |
| 0.61 | 70.2 | 70.2 | 100.0 |
| 0.66 | 66.8 | 66.8 | 100.0 |
| 0.71 | 62.8 | 62.8 | 100.0 |
| 0.75 | 58.2 | 58.2 | 100.0 |

Figure 33:
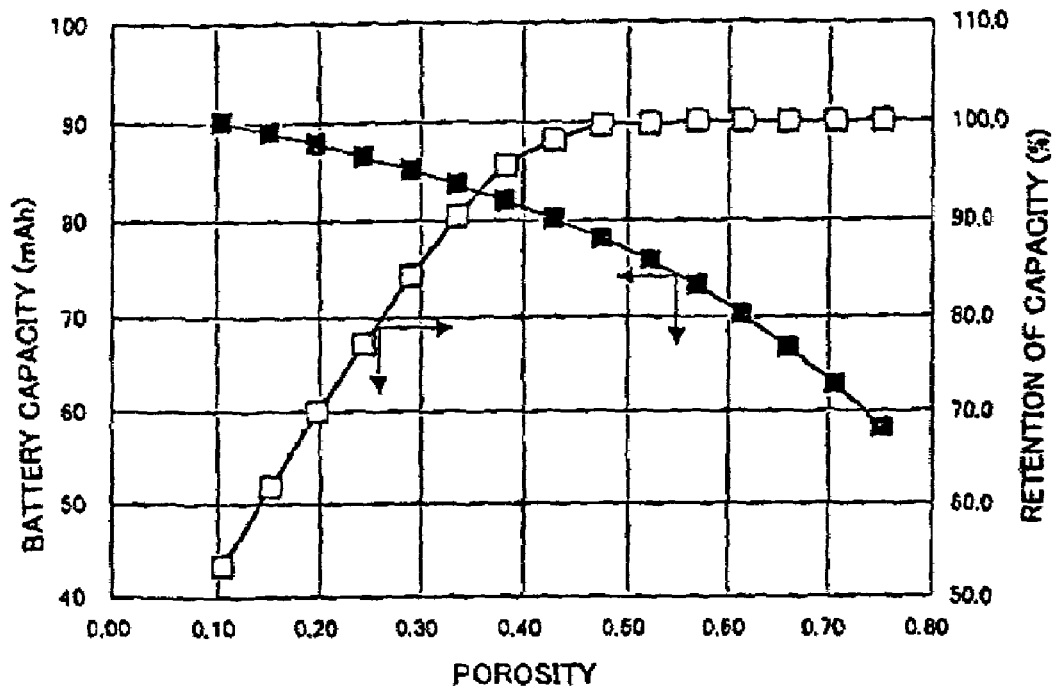
FIG. 33 is a diagram showing the relation between the battery capacity and the porosity.

FIG. 33 shows the relation between the porosity and the initial discharging capacity and between the porosity and the retention of capacity after 1000 cycles. The retention of capacity is defined as the ratio (%) of the discharging capacity after 1000 cycles to the discharging capacity in the first cycle.

Figure 34:
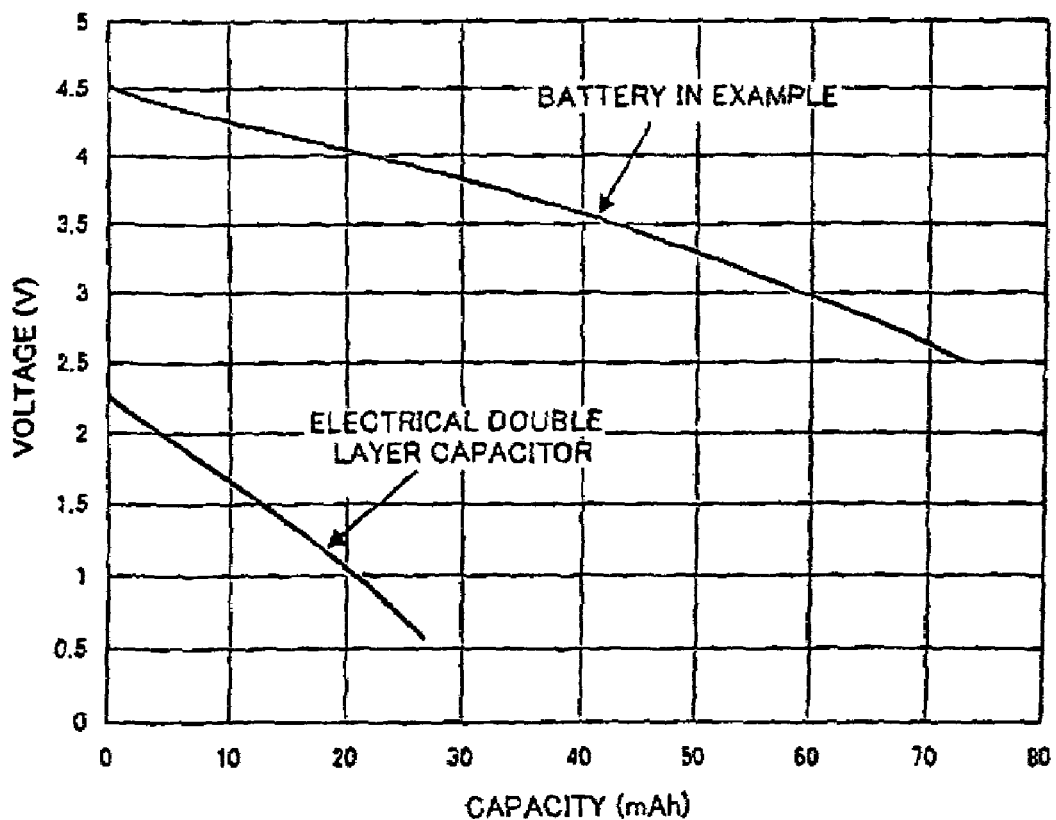
FIG. 34 is a diagram showing the discharging curve of the battery of 18650 type and the discharging curve of the electrical double layer capacitor.

As shown in FIG. 33, the battery capacity decreases with the increasing porosity, and conversely, the retention of capacity after 1000 cycles improves as the porosity increases. All the batteries tested had a retention of about 100% if they have a porosity higher than 0.57. FIG. 34 shows the initial discharging curve of the battery whose positive electrode mix has a porosity of 0.57. (This curve is a typical charging-discharging curve.) Incidentally, it was found that the battery conforming to this specification keeps a retention of capacity which is about 100% until 1000 cycles and the discharging curve up to the 1000th cycle nearly coincides with the initial discharging curve. Those batteries in which the porosity of the positive electrode mix differs is specified differently also gave almost the same discharging capacity as shown above. The foregoing suggests that the porosity should be set at 0.2-0.6 if the battery is to meet the requirement that the retention of discharging capacity after 1000 cycles be higher than 70% and the discharging capacity be higher than 70 mAh.

The electrical double layer capacitor tested for comparison gave an initial discharging capacity of 26.8 mAh, a discharging capacity of 26.8 mAh after 1000 cycles, and a 99.9% retention of capacity after 1000 cycles. FIG. 34 shows the initial discharging curve. It was found that the electrical double layer keeps an approximately 100% retention of capacitor up to 1000 cycles and that the discharging curve up to the 1000th cycle nearly coincides with the initial discharging curve. The electrical double layer capacitor keeps a high retention of capacity up to the 1000th cycles but has a lower discharging capacity as compared with the battery in the above-mentioned example.

The electric power calculated from the discharging curve shown in FIG. 34 is 0.263 Wh (for the battery in the example) and 0.027 Wh (for the electrical double layer capacitor). The energy density of the battery in the example is about ten times as high as that of the electrical double layer capacitor.

The present invention provides a nonaqueous electrolyte secondary battery having a large capacity and an outstanding cycle characteristic, and also provides a process for production of the positive electrode thereof.

EXPLANATION OF REFERENCE NUMERALS

4 Positive electrode
5 Negative electrode
7 Innermost periphery of beltlike positive electrode
8 Innermost periphery of beltlike negative electrode
9 The first margin
10 End of Innermost region of beltlike negative electrode
11 End of innermost region of beltllke positive electrode
12 Outermost periphery of beitlike positive electrode
13 Outermost periphery of beltlike negative electrode
14 The second margin
15 End of outermost region of beltlike positive electrode
16 End of outermost region of beitlike negative electrode
17 End in widthwise direction of negative electrode
18 End in widthwise direction of negative electrode
19 End in widthwise direction of positive electrode
20 End In widthwlse direction of positive electrode
21 The third margin
22 The fourth margin

What is claimed is:

1. A nonaqueous electrolyte secondary battery comprising:
a positive electrode made of a graphitic material,
an electrolyte containing a lithium salt; and
a negative electrode made of a carbonaceous material capable of occluding and releasing lithium metal or lithium,
wherein said positive electrode is an graphitic material that has not been introduced with a conductor, the graphitic material is a graphite crystal having some of carbon atoms forming hexagonal network planes replaced by boron atoms or having boron atoms infiltrated into between layers of hexagonal network planes, and said positive electrode is formed from boron or a boron compound contained in the graphite, such that the content of boron therein is 0.05-11 wt %.

2. A nonaqueous electrolyte secondary battery as defined in claim 1, wherein the positive electrode is formed from a silicon-containing graphitic material containing silicon or a silicon compound such that the content of silicon therein is 0.01-5 wt %.

3. A nonaqueous electrolyte secondary battery defined in any of claims 1 and 2, wherein the graphitic material meets the following requirements (a) and (b):
(a) the graphitic material having a graphite crystal structure has the (002) plane such that the average interplaner spacing d(002) is no larger than 3.365 Å;
(b) Raman spectroscopy with an argon ion laser beam having a wavelength of 5145 Å gives a peak (Pa) in the wavelength region of $1580\pm100$ cm$^{-1}$ and a peak (Pb) in the wavelength region of $1360\pm100$ cm$^{-1}$, with the peak (Pa) having a peak intensity (Ia) and the peak (Pb) having a peak intensity (Ib) such that the value of R defined as Value (R)=Ib/Ia is no smaller than 0.35.

* * * * *